United States Patent
Sanchez-Monge et al.

(10) Patent No.: US 11,416,970 B2
(45) Date of Patent: Aug. 16, 2022

(54) PANORAMIC IMAGE CONSTRUCTION BASED ON IMAGES CAPTURED BY ROTATING IMAGER

(71) Applicant: Teledyne FLIR Commercial Systems, Inc., Goleta, CA (US)

(72) Inventors: Enrique Sanchez-Monge, Tampere (FI); Alessandro Foi, Tampere (FI)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/087,551

(22) Filed: Nov. 2, 2020

(65) Prior Publication Data

US 2021/0049738 A1 Feb. 18, 2021

Related U.S. Application Data

(63) Continuation of application No. PCT/US2019/032440, filed on May 15, 2019.
(Continued)

(51) Int. Cl.
*G06T 5/00* (2006.01)
*G06T 3/40* (2006.01)
(Continued)

(52) U.S. Cl.
CPC ............ *G06T 5/003* (2013.01); *G06T 3/0006* (2013.01); *G06T 3/4038* (2013.01); *G06T 5/002* (2013.01);
(Continued)

(58) Field of Classification Search
CPC ...................... G06T 5/003; G06T 5/002; G06T 2207/20182; G06T 2207/20201;
(Continued)

(56) References Cited

U.S. PATENT DOCUMENTS

| 10,104,286 | B1 * | 10/2018 | Yu | ............................. G06K 9/46 |
| 2015/0254813 | A1 * | 9/2015 | Foi | ........................... G06T 5/002 382/275 |

(Continued)

OTHER PUBLICATIONS

Nielsen, Frank, Alexis André, and Shigeru Tajima. "Real-time spherical videos from a fast rotating camera." International Conference Image Analysis and Recognition. Springer, Berlin, Heidelberg, 2008. (Year: 2008).*

(Continued)

*Primary Examiner* — Geoffrey E Summers
(74) *Attorney, Agent, or Firm* — Haynes and Boone, LLP

(57) ABSTRACT

Techniques are disclosed for panoramic image construction based on images captured by rotating imagers. In one example, a method includes receiving a first sequence of images associated with a scene and captured during continuous rotation of an image sensor. Each image of the first sequence has a portion that overlaps with another image of the first sequence. The method further includes generating a first panoramic image. The generating includes processing a second sequence of images based on a point-spread function to mitigate blur associated with the continuous rotation to obtain a deblurred sequence of images, and processing the deblurred sequence based on a noise power spectral density to obtain a denoised sequence of images. The point-spread function is associated with the image sensor's rotation speed. The second sequence is based on the first sequence. The first panoramic image is based on the denoised sequence.

20 Claims, 21 Drawing Sheets

Related U.S. Application Data

(60) Provisional application No. 62/671,967, filed on May 15, 2018.

(51) Int. Cl.
    *G06T 3/00*      (2006.01)
    *G06T 7/38*      (2017.01)

(52) U.S. Cl.
    CPC ...... *G06T 7/38* (2017.01); *G06T 2207/10016* (2013.01); *G06T 2207/10048* (2013.01); *G06T 2207/20182* (2013.01); *G06T 2207/20201* (2013.01)

(58) Field of Classification Search
    CPC ....... G06T 3/0006; G06T 3/4038; G06T 7/38; G06T 2207/10016; G06T 2207/10048
    See application file for complete search history.

(56) References Cited

U.S. PATENT DOCUMENTS

| | | | |
|---|---|---|---|
| 2016/0037073 A1* | 2/2016 | Mills | H04N 5/23254 348/208.2 |
| 2021/0241426 A1* | 8/2021 | Kelly | G06T 5/002 |

OTHER PUBLICATIONS

Chen, Shenchang Eric. "Quicktime VR: An image-based approach to virtual environment navigation." Proceedings of the 22nd annual conference on Computer graphics and interactive techniques. 1995. (Year: 1995).*

Frantz Pelissier. Modélisation et développement d'une plateforme intelligente pour la capture d'images panoramiques cylindriques. Autre. Université Blaise Pascal—Clermont-Ferrand II, 2014. Français. (Year: 2014).*

\* cited by examiner

PANORAMIC IMAGE CONSTRUCTION BASED ON IMAGES CAPTURED BY ROTATING IMAGER

CROSS-REFERENCE TO RELATED APPLICATIONS

This patent application is a continuation of International Patent Application No. PCT/US2019/032440 filed May 15, 2019 and entitled "PANORAMIC IMAGE CONSTRUCTION BASED ON IMAGES CAPTURED BY ROTATING IMAGER," which is hereby incorporated by reference in its entirety.

International Patent Application No. PCT/US2019/032440 claims the benefit of U.S. Provisional Patent Application No. 62/671,967 filed May 15, 2018 and entitled "PANORAMIC IMAGE CONSTRUCTION BASED ON IMAGES CAPTURED BY ROTATING IMAGER" which is hereby incorporated by reference in its entirety.

TECHNICAL FIELD

One or more embodiments relate generally to imaging systems and more particularly, for example, to panoramic image construction based on images captured by rotating imagers.

BACKGROUND

Imaging systems may include an array of detectors, with each detector functioning as a pixel to produce a portion of a two-dimensional image. There are a wide variety of image detectors, such as visible image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA).

Advances in process technology for FPAs and image processing have led to increased capabilities and sophistication of resulting imaging systems.

SUMMARY

In one or more embodiments, a method includes receiving a first sequence of images captured during continuous rotation of an image sensor. The first sequence is associated with a scene. Each image of the first sequence has a portion that overlaps with another image of the first sequence. The method further includes generating a first panoramic image. The generating includes processing a second sequence of images based on a first point-spread function to mitigate blur associated with the continuous rotation of the image sensor to obtain a deblurred sequence of images. The first point-spread function is associated with a rotation speed of the image sensor. The second sequence is based on the first sequence. The generating further includes processing the deblurred sequence of images based on at least one noise power spectral density to obtain a denoised sequence of images, wherein the first panoramic image is based on the denoised sequence of images.

In one or more embodiments, a system includes an image sensor configured to capture a first sequence of images during continuous rotation of the image sensor. The first sequence is associated with a scene. Each image of the first sequence has a portion that overlaps with another image of the first sequence. The system further includes a non-transitory memory storing computer instructions. The system further includes one or more hardware processors communicatively coupled to the image sensor and the non-transitory memory, the one or more hardware processors configured to read the computer instructions from the non-transitory memory to cause the system to perform operations. The operations include receiving the first sequence of images. The operations further include generating a first panoramic image. The generating comprises processing a second sequence of images based on a first point-spread function to mitigate blur associated with the continuous rotation of the image sensor to obtain a deblurred sequence of images. The first point-spread function is associated with a rotation speed of the image sensor. The second sequence is based on the first sequence. The generating further includes processing the deblurred sequence of images based on a first noise power spectral density to obtain a denoised sequence of images. The first panoramic image is based on the deblurred sequence of images.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
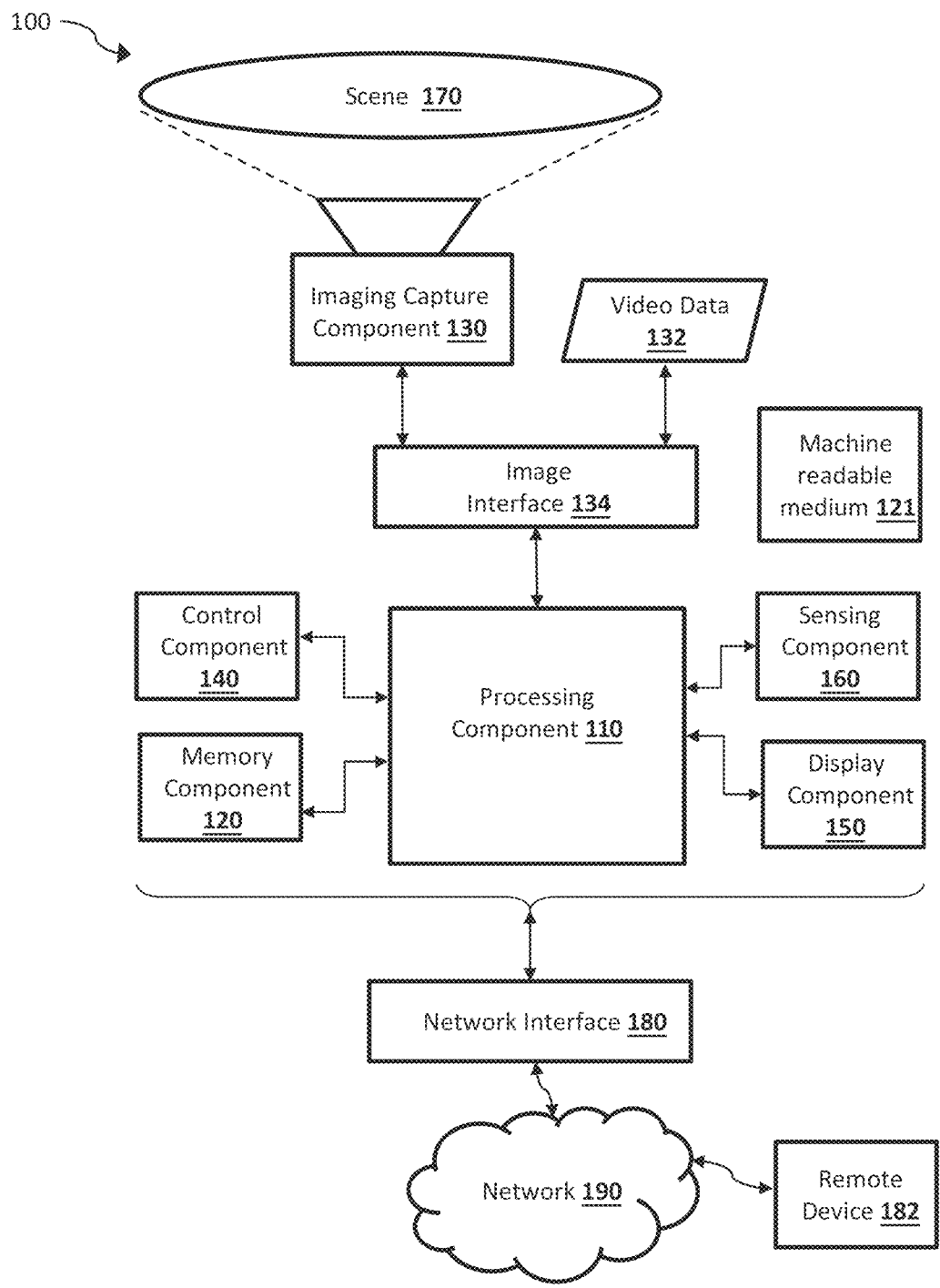
FIG. 1A illustrates a block diagram of an example imaging system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various embodiments of methods and systems disclosed herein may be used to facilitate panoramic imaging based on a set of images (e.g., a sequence of images) of a scene captured under continuous rotation of an imager. The panoramic imaging may allow generation of a panoramic image (e.g., referred to as a panorama image or reconstructed image) with a field of view (FOV) wider than an FOV of each image in the set of captured images used to generate (e.g., construct) the panoramic image. In this regard, the panoramic image may be generated from a set of narrower FOV images captured under continuous rotation. In some embodiments, methods and systems disclosed herein may be utilized in security applications (e.g., surveillance applications, maritime applications), mapping applications, and/or generally any applications in which wide field of view (FOV) (e.g., 360° FOV) situational awareness of a scene is desired. In a case that the imager is a thermal imager, the imager may capture thermal images and generate (or facilitate generation) of a panoramic thermal image.

In some cases, the panoramic image may have a 360° FOV, in which the set of captured images used to generate the panoramic image span 360° coverage of the scene. In other cases, the panoramic image may have less than 360° FOV. In some aspects, an output of the panorama imaging may be a 360° FOV video with spatiotemporal consistency at a frame rate approximately equivalent to a number of rotations per second.

The continuous rotation of the imager may be performed manually (e.g., by a user rotating the imager) or performed via electrical and/or mechanical control (e.g., gimbal systems, motors, gears, actuators, etc.). A processing component(s) may be utilized to generate the panoramic image based on the images captured under continuous rotation of the imager. The processing component(s) may be embedded in, coupled to (e.g., communicatively coupled to), or otherwise have access to the imager's captured images.

In some embodiments, the set of images may be captured by the rotating imager using a rolling shutter methodology, in which the images are captured one after another at discrete instants in time as the rotating imager scans a scene (e.g., scans up to 360° of the scene). Such methodology contrasts with using multiple imagers oriented to capture images at different FOVs to take multiple images of the scene at the same instant in time. In this regard, a single imager may be utilized to cover a wider FOV (e.g., 360° FOV) by rotating the single imager across the entirety of the wider FOV such that each image captured during the rotation covers a portion of the wider FOV. Utilization of a single imager to cover the wider FOV may allow for lower costs relative to a case in which more imagers are utilized to collectively cover the wider FOV (e.g., each of the imagers is designated/oriented to cover a portion of the wider FOV).

Using the rolling shutter methodology, the acquired images from the rotating imager form a series of consecutive snapshots of the scene (e.g., discrete sampling in time of the scene). In some cases, the series of consecutive snapshots may form a set of partially overlapping images of the scene taken at different instants in time. In general, a larger amount of overlap between consecutive images may facilitate (e.g., when the images are properly processed) generation of a panoramic image of higher quality. In some aspects, a minimum overlap of 50% may be provided between any two consecutive images among the set of captured images. Consecutive images (e.g., also referred to as adjacent images or temporally adjacent images) may refer to images captured in adjacent time instants. For example, an image captured at a discrete time instant n=3 may be considered adjacent to an image captured at a previous time instant n=2 and an image captured at a next time instant n=4.

While the images are acquired in discrete time, the panoramic image to be generated based on the images is generally synthesized in a space-time continuous manner such that moving objects in the scene show continuous motion. In an embodiment, to facilitate synthesis of a panoramic image in a space-time continuous manner, a global spatiotemporal line may be defined in a space-time reference frame, as further described herein. In some cases, the global spatiotemporal line may be, or may be considered to be, a virtual space-time line that provides a synthesis reference for creating the panoramic image.

In some embodiments, spatiotemporal consistency may be achieved. Due to capture under continuous rotation of the imager, consecutive input frames are partially, spatially overlapping and captured at different time instances. Tiling the frames to generate a panoramic image may break spatiotemporal consistency. For example, different parts of the panoramic image may represent different points in time and moving objects in the scene may appear multiple times (e.g., in multiple captured frames) and/or be subject to artifacts. From a discrete spatiotemporal manifold, a smooth (e.g., continuous) spatiotemporal panorama may be created where objects in the overlapping narrower FOV image frames may be only rendered once on a smooth time plane over a full imager rotation (e.g., rotation of up to and including 360°). In some aspects, an output of the panoramic imaging may be a 360° FOV video with spatiotemporal consistency at a frame rate approximately equivalent to a number of rotations per second.

In some aspects, each of the narrower FOV images may have motion blur, noise (e.g., spatial and/or temporal noise), and image shear that may at least partially be attributable to rolling shutter. Embodiments provided herein mitigate these degradations such that these degradations are reduced or eliminated from output panoramic images (e.g., ready for storage, display, post-processing, and/or other operations) generated based on sets of captured images. In some aspects, a denoising and deblurring framework may be utilized to create panoramic images (e.g., 360° images) from video sequences acquired with a rotating imager (e.g., rotating thermal imager). In some cases, the denoising framework may be based on a video block-matching and 4-dimensional (VBM4D) filtering framework, such as described with reference to FIGS. 2A through 11B, or a modified version thereof. In addition to denoising capabilities of the framework, the framework may be provided with or supplemented with motion deblurring and/or panoramic image stitching capabilities. As an example, such denoising, deblurring, and/or stitching capabilities may be implemented in MATLAB®, compliant with Code Generation requirements. In some aspects, increased noise levels that may be present post-deblurring may be mitigated by modeling (e.g., accounting for) the effect of the deblurring on the noise characteristics. In some cases, a directionally (e.g., vertically) varying deblurring kernel may be utilized to compensate for curved object trajectories if the imager is not mounted perfectly perpendicular to a rotational axis. Shearing of the panoramic image due to rolling shutter and/or faster motion may be mitigated.

In some embodiments, methods and systems for facilitating generation of a panoramic image based on a captured sequence of overlapping images are provided herein. The sequence of overlapping images may be acquired by a rotating imager (e.g., rotating sensor). As an example, for explanatory purposes, the rotation of the imager may be along a horizontal direction. In an aspect, the horizontal direction may be referred to as a horizontal orientation, an azimuthal direction/orientation, or a landscape orientation. However, the rotation associated with the imager may be along other directions, such as a vertical direction, diagonal direction, or generally any direction.

Images captured as the rotating imager is rotating in the horizontal direction may be subject to horizontal motion blur that degrades the captured images (e.g., and the panoramic image generated based on these captured images) in addition to usual noise associated with the imager. In an aspect, to mitigate degradations associated with capture using the rotating imager, a reconstruction pipeline (e.g., a modified version of the VBM4D pipeline) and associated post-processing may be provided. A first stage of the reconstruction pipeline may include performing spatial column noise removal. A second stage may include performing deblurring, where the horizontal motion blur caused by the rotation may be mitigated (e.g., reduced or eliminated). A third stage may include denoising. The denoising stage may involve a block-based spatiotemporal filter that uses motion vectors obtained by block-matching to track trajectories of blocks along a temporal window spanning overlapping portions of adjacent frames. The blocks following forming the spatiotemporal volume trajectory may be extracted and stacked together, forming spatiotemporal volumes (STVs) on which collaborative filtering may be applied. The filtered blocks may then be aggregated to generate a reconstructed image (e.g., panoramic image). As a post-processing operation, a shearing effect introduced by the rotation (e.g., rolling shutter) may be compensated to obtain a straight reconstructed image (e.g., straight panoramic image).

In some cases, in generating the panoramic image, to deal with overlapping areas of images and with the synthesis of a wide FOV panoramic image (e.g., 360° panoramic image), a global spatiotemporal line is defined as a continuous line in a space-time coordinate system where the panoramic image is to be synthesized. For each of the STVs, the intersection between its trajectory and the global spatiotemporal line may be determined and used to interpolate position and content of an intermediate block within the STV. Such interpolation may be referred to as block interpolation. The newly interpolated blocks may be aggregated to their corresponding spatial positions in the panoramic image to form the panoramic image (e.g., an estimate of the panoramic image). Afterwards, the shearing effect may be compensated for in the panoramic image.

Various embodiments of methods and systems disclosed herein may be used to model random noise (RND) and fixed-pattern noise (FPN) to suppress both types of noise in images (e.g., video or still images). Filtering operations may be adaptively performed (e.g., on STVs) based on estimated noise parameters and the motion captured in the volumes (e.g., relative spatial alignment of image blocks from frame to frame). In some embodiments, such filtering operations may be efficiently performed by applying a three-dimensional (3-D) transform (e.g., a discrete cosine transform (DCT), discrete sine transform (DST), discrete wavelet transform (DWT), or other orthogonal transforms). Video image frames in some embodiments may be a set of discrete still images, which can be utilized to provide digital still images (e.g., as digital photographs captured by a digital camera). In an aspect, a video image frame may be referred to as a video image, video frame, image, frame, image frame, or variant thereof.

Various embodiments of methods and systems disclosed herein may be included in or implemented as various devices and systems such as infrared imaging devices, mobile digital cameras, video surveillance systems, video processing systems, or other systems or devices that may need to obtain acceptable quality video images from video images impaired by noise (e.g., captured by infrared image sensors or other sensors). Furthermore, various techniques disclosed herein are not limited to providing noise suppression, but may further beneficially improve performance of various other video processing operations such as enhancement, restoration, deblurring, equalization, sharpening, super-resolution, and other operations that can be impaired by noise, as well as performance of high-level analytics such as object detection, object identification, target tracking, segmentation, scene tracking, and other analytics operations.

Such imaging devices and systems may be provided in, mounted on, and/or otherwise communicatively coupled with structures (e.g., a building for security applications) or vehicles, such as land-based vehicles (e.g., automobiles), naval-based vehicles (e.g., watercraft), aerial vehicles (e.g., manned or unmanned aerial vehicles), space vehicles, and/or others. In general, utilization of a single rotatable imager in such a system to cover a wider FOV may allow for lower costs relative to an example in which the system utilizes more imagers to collectively cover the wider FOV (e.g., each of the imagers is designated/oriented to cover a portion of the wider FOV).

Using various embodiments, vehicles having a rotatable imager coupled to them may capture sets of images (e.g., overlapping images) according to a rolling shutter methodology and appropriately process the captured sets of images to generate panoramic images of high quality to facilitate desired applications. As one example, in a maritime application, an infrared imaging device may be mounted on a watercraft. The infrared imaging device may capture images under continuous rotation (e.g., to cover a wide FOV) to facilitate night vision, night docking, detection and mitigation of man overboard situations, chemical detection (e.g., by differentiating between water and chemicals on or in the water), surveillance of a shoreline, navigation of the watercraft, and/or generally any actions associated with providing situational awareness, while the vehicle is stationary or in motion. As one example, a safety authority (e.g., coast guard) may place infrared markers at certain locations in a body of water, which may serve to identify locations of docks, rocks, oil spills, and/or other obstacles or locations of interest (e.g., locations to be reached or avoided by vehicles), The infrared imaging device of a vehicle can pick up the presence of these infrared markers. As another example, in an aerial surveillance application, an infrared imaging device may be mounted to an aircraft (e.g., a drone). The infrared imaging device may capture images under continuous rotation to facilitate surveillance of an area, fire detection, navigation of the aircraft (e.g., unmanned flight or manned flight), and/or generally any actions associated with providing situational awareness, while the vehicle is stationary or in motion.

Referring now to the drawings, FIG. 1A illustrates a block diagram of an example imaging system 100 (e.g., an infrared imaging system) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images and videos (e.g., video frames) in accordance with an embodiment of the disclosure. The imaging system 100 includes, according to one implementation, a processing component 110, a memory component 120, an image capture component 130, an image interface 134, a control component 140, a display component 150, a sensing component 160, and/or a network interface 180. In an embodiment, the imaging system 100 may include a portable device and may be incorporated, for example, into a vehicle (e.g., an automobile or other type of land-based vehicle, a naval-based vehicle, an unmanned aerial vehicle (UAV), unmanned aircraft system (UAS), drone, or other type of aircraft or spacecraft) or a non-mobile installation requiring images to be stored and/or displayed.

The imaging system 100 may represent an imaging device, such as a video and/or still camera, to capture and process images and/or videos of a scene 170. In this regard, the image capture component 130 of the imaging system 100 may be configured to capture images (e.g., still and/or video images) of the scene 170 in a particular spectrum or modality. The image capture component 130 may include, may be a part of, or may be referred to as an imager or an image sensor. For example, in some embodiments, the image capture component 130 may include a complementary metal oxide semiconductor (CMOS) sensor or a charge-coupled device (CCD) sensor that can be found in any consumer camera (e.g., visible light camera). In some other embodiments, alternatively or in addition, the image capture component 130 may include an infrared (IR) imaging sensor configured to detect IR radiation in the near, middle, and/or far IR spectrum and provide IR images (e.g., IR image data or signal) representative of the IR radiation from the scene 170. In one specific, not-limiting example, the image capture component 130 may comprise a thermal IR imaging sensor having a focal plane array (FPA) of detectors responsive to thermal IR radiation including short-wave IR (SWIR), mid-wave IR (MWIR), and/or long-wave IR (LWIR) radiation.

In some embodiments, the image capture component 130 may be rotated during capture of images in the scene 170. The rotation of the image capture component 130 may refer to a physical rotation of the image capture component 130 or component(s) therein and/or thereof such that the image capture component 130 (e.g., a shutter of the image capture component 130) captures a different portion of the scene 170 as the image capture component 130 is rotated. An FOV the image capture component 130 may overlap between frames. In some aspects, the rotation may be performed manually (e.g., a user rotates the image capture component 130) or performed by electrical and/or mechanical control (e.g., gears, actuators, etc.) provided by or otherwise coupled to the image capture component 130. In some cases, a single imager (e.g., single camera) may be rotated to capture images of the scene 170 to allow synthesis of a panoramic image based on the captured images. Utilizing a single imager may be associated with lower costs than a case in which multiple imagers are used to capture images simultaneously or substantially simultaneously to allow synthesis of a panoramic image.

Other imaging sensors that may be embodied in the image capture component 130 include a PMD imaging sensor or other ToF imaging sensor, LIDAR imaging device, millimeter imaging device, PET scanner, SPECT scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 130 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The processing component 110, according to various embodiments, includes one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The processing component 110 may be configured to interface and communicate with various other components of the imaging system 100 to perform such operations. In one aspect, the processing component 110 may be configured to perform various system control operations (e.g., to control communications and operations of various components of the imaging system 100) and other image processing operations (e.g., data conversion, video analytics, deblurring suppression, noise suppression), as part of or separate from the operations to remove non-uniformity data from images. For example, the processing component 110 may include a noise filtering module configured to implement a noise suppression and/or removal operation such as discussed in reference to FIGS. 2A-13. In one aspect, the processing component 110 may be configured to perform various other image processing algorithms including scaling and/or converting image data, either as part of or separate from the noise filtering operation.

The memory component 120 includes, in one embodiment, one or more memory devices configured to store data and information, including video image data and information. The memory component 120 may include one or more various types of memory devices including volatile and non-volatile memory devices, such as random access memory (RAM), read-only memory (ROM), electrically-erasable read-only memory (EEPROM), flash memory, hard disk drive, and/or other types of memory. As discussed above, the processing component 110 may be configured to execute software instructions stored in the memory component 120 so as to perform method and process steps and/or operations described herein. The processing component 110 and/or image interface 134 may be configured to store in the memory component 120 images or digital image data captured by the image capture component 130. The processing component 110 may be configured to store processed (e.g., low-frequency non-uniformity corrected, as discussed herein) still and/or video images in the memory component 120.

In some embodiments, a separate machine-readable medium 121 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, the machine-readable medium 121 may be portable and/or located separate from the system 100, with the stored software instructions and/or data provided to the system 100 by coupling the computer-readable medium to system 100 and/or by system 100 downloading (e.g., via a wired link and/or a wireless link) from the machine-readable medium 121.

For example, it should be appreciated that various modules may be integrated in software and/or hardware as part of the processing component 110, with code (e.g., software or configuration data) for the modules stored, for example, in the memory component 120. By way of non-limiting example, such modules may include a noise filtering module, spatial column noise removal module, deblurring module, motion vector base non-uniformity correction module, and/or de-shearing module. In some embodiments, various instructions disclosed herein may be stored by a separate machine-readable medium 121 (e.g., a memory, such as a hard drive, a compact disk, a digital video disk, or a flash memory) to be executed by a computer (e.g., a logic or processor-based system) to perform various methods and operations disclosed herein. In one aspect, the machine-readable medium 121 may be portable and/or located separate from the system 100, with the stored instructions provided to the system 100 by coupling the machine-readable medium 121 to system 100 and/or by system 100 downloading (e.g., via a wired link and/or a wireless link) the instructions from the machine-readable medium 121.

The image interface 134 may include, in some embodiments, appropriate input ports, connectors, switches, and/or circuitry configured to interface with external devices (e.g., a remote device 182 and/or other devices) to receive images (e.g., digital image data) generated by or otherwise stored at the external devices. The received images or image data may be provided to the processing component 110. In this regard, the received images or image data may be converted into signals or data suitable for processing by the processing component 110. For example, in one embodiment, the image interface 134 may be configured to receive analog video data and convert it into suitable digital data to be provided to the processing component 110.

In some embodiment, the image interface 134 may include various standard video ports, which may be connected to a video player, a video camera, or other devices capable of generating standard video signals, and may convert the received video signals into digital video/image data suitable for processing by the processing component 110. In some embodiments, the image interface 134 may also be configured to interface with and receive images (e.g., image data) from the image capture component 130. In other embodiments, the image capture component 130 may interface directly with the processing component 110.

The image capture component 130 may include, in various embodiments, one or more image sensors for capturing image data (e.g., still image data and/or video data) representative of an image, such as the scene 170. In one embodiment, the image capture component 130 may include one or more infrared sensors (e.g., any type of multi-pixel infrared detector, such as a focal plane array) for capturing thermal image data (e.g., thermal still image data and/or thermal video data) representative of an image, such as the scene 170. In one embodiment, the infrared sensors of the image capture component 130 may provide for representing (e.g., converting) the captured image data as digital data (e.g., via an analog-to-digital converter included as part of the infrared sensor or separate from the infrared sensor as part of the system 100). In another embodiment, digital conversion and/or other interfacing may be provided at the video interface component 134.

In one aspect, video and/or still image data (e.g., thermal video data) may include non-uniform data (e.g., real image data) of an image, such as the scene 170. Video and/or still image data may also include, in some embodiments, uniform data (e.g., image data of a shutter or a reference black body) that may be utilized, for example, as calibration video and/or calibration image data. The processing component 110 may be configured to process the captured image data (e.g., to provide processed image data), store the image data in the memory component 120, and/or retrieve stored image data from the memory component 120. For example, the processing component 110 may be adapted to process thermal image data stored in the memory component 120 to provide processed (e.g., filtered) image data and information.

The control component 140 includes, in one embodiment, a user input and/or interface device, such as a rotatable knob (e.g., potentiometer), push buttons, slide bar, keyboard, and/or other devices, that is adapted to generate a user input control signal. The processing component 110 may be configured to sense control input signals from a user via the control component 140 and respond to any sensed control input signals received therefrom. The processing component 110 may be configured to interpret such a control input signal as a value, as generally understood by one skilled in the art. In one embodiment, the control component 140 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 150 includes, in one embodiment, an image display device (e.g., a liquid crystal display (LCD)) or various other types of generally known video displays or monitors. The processing component 110 may be configured to display image data and information on the display component 150. The processing component 110 may be configured to retrieve image data and information from the memory component 120 and display any retrieved image data and information on the display component 150. The display component 150 may include display circuitry, which may be utilized by the processing component 110 to display image data and information. The display component 150 may be adapted to receive image data and information directly from the image capture component 130, processing component 110, and/or video interface component 134, or the image data and information may be transferred from the memory component 120 via the processing component 110.

The sensing component 160 includes, in one embodiment, one or more sensors of various types, depending on the application or implementation requirements, as would be understood by one skilled in the art. Sensors of the sensing component 160 provide data and/or information to at least the processing component 110. In one aspect, the processing component 110 may be configured to communicate with the sensing component 160. In various implementations, the sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 160 may represent conventional sensors as generally known by one skilled in the art for monitoring various conditions (e.g., environmental conditions) that may have an effect (e.g., on the image appearance) on the image data provided by the image capture component 130.

In some implementations, the sensing component 160 (e.g., one or more of sensors) may comprise devices that relay information to the processing component 110 via wired and/or wireless communication. For example, the sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 110 can use the information (e.g., sensing data) retrieved from the sensing component 160 to modify a configuration of the image capture component 130 (e.g., adjusting a light sensitivity level, adjusting a direction or angle of the image capture component 130, adjusting an aperture, etc.).

In various embodiments, various components of the imaging system 100 may be combined and/or implemented or not, as desired or depending on the application or requirements. In one example, the processing component 110 may be combined with the memory component 120, image capture component 130, video interface component 134, display component 150, network interface 180, and/or sensing component 160. In another example, the processing component 110 may be combined with the image capture component 130, such that certain functions of processing component 110 are performed by circuitry (e.g., a processor, a microprocessor, a logic device, a microcontroller, etc.) within the image capture component 130.

Furthermore, in some embodiments, various components of the imaging system 100 may be distributed and in communication with one another over a network 190. In this regard, the imaging system 100 may include a network interface 180 configured to facilitate wired and/or wireless communication among various components of the imaging system 100 over the network 190. In such embodiments, components may also be replicated if desired for particular applications of the system 100. That is, components configured for same or similar operations may be distributed over a network. Further, all or part of any one of the various components may be implemented using appropriate components of a remote device 182 (e.g., a conventional digital video recorder (DVR), a computer configured for image processing, and/or other device) in communication with various components of the imaging system 100 via the network interface 180 over the network 190, if desired. Thus, for example, all or part of the processing component 110, all or part of the memory component 120, and/or all of part of the display component 150 may be implemented or replicated at the remote device 182, and configured to perform resolution enhancement of images as further described herein. In some embodiments, the imaging system 100 may not include imaging sensors (e.g., image capture component 130), but instead receive images or image data from imaging sensors located separately and remotely from the processing component 110 and/or other components of the imaging system 100. It will be appreciated that many other combinations of distributed implementations of the imaging system 100 are possible, without departing from the scope and spirit of the disclosure.

Figure 1B:
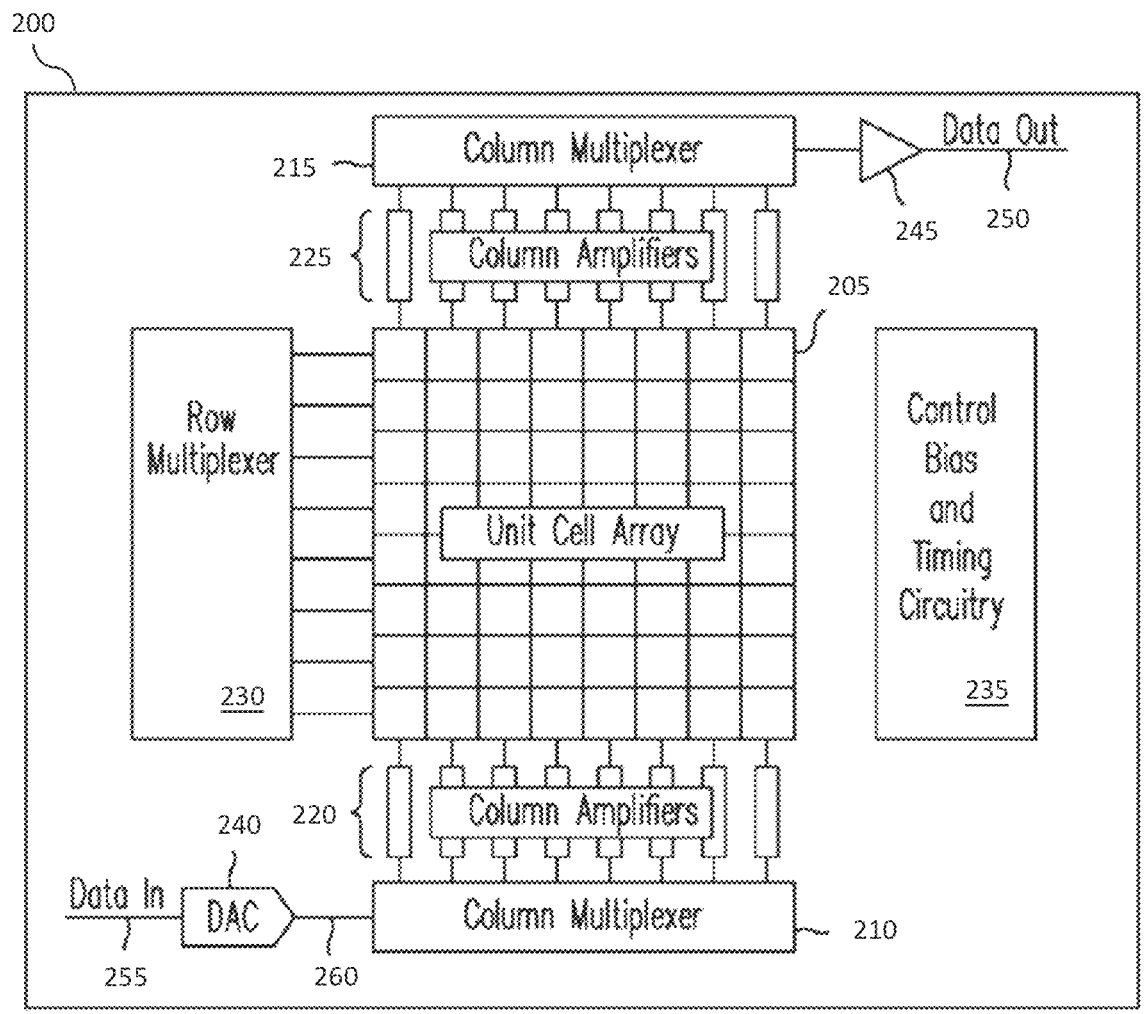
FIG. 1B illustrates a block diagram of an example image sensor assembly in accordance with one or more embodiments of the present disclosure.

FIG. 1B illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be a focal plane array, for example, implemented as an image sensor in the image capture component 130 of FIG. 1B.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and interface circuitry. The interface circuitry of each unit cell may provide an output signal, such as an output voltage or current, in response to a detector signal (e.g., detector current, detector voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The data output signal may be an image formed of the pixel values for the image sensor assembly 200. In this regard, the column multiplexer 215, column amplifiers 220, row multiplexer 230, and data output buffer 245 may collectively provide an ROIC (or portion thereof) of the image sensor assembly 200.

In an aspect, the column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array traverses to get to the column multiplexer 215. As another example, the column amplifiers 225 may include an ADC for converting analog signals to digital signals. These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 110 and/or imaging capture component 130 of FIG. 1A.

In an aspect, the image sensor assembly 200 may be implemented as part of an imaging system (e.g., 100). In addition to the various components of the image sensor assembly 200, the imaging system may also include one or more processors, memories, logic, displays, interfaces, lenses, and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz.

Figure 2A:
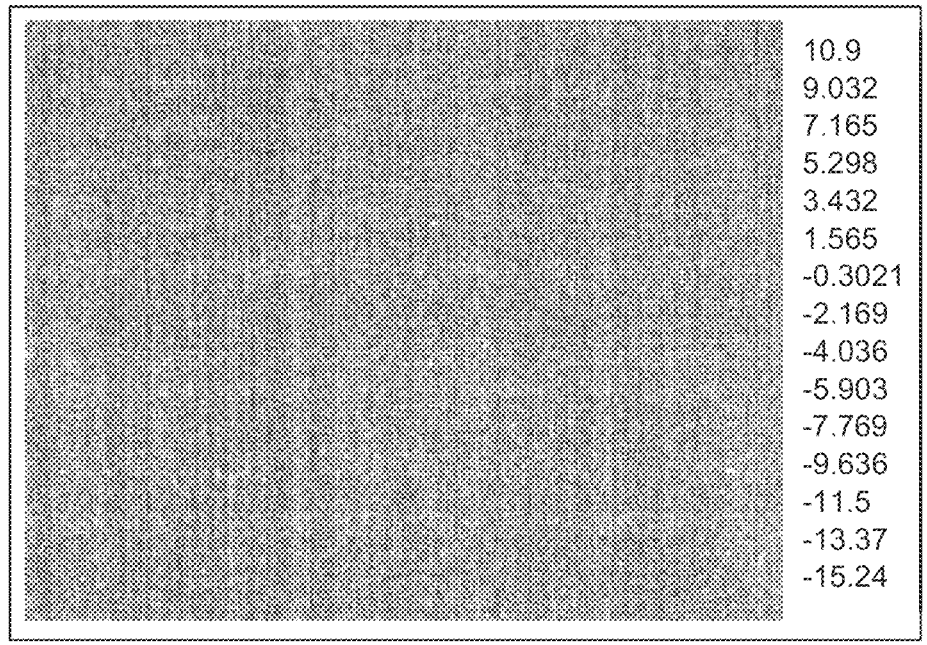
FIGS. 2A and 2B illustrate examples of random noise in video images in accordance with one or more embodiments of the present disclosure.
Figure 2B:
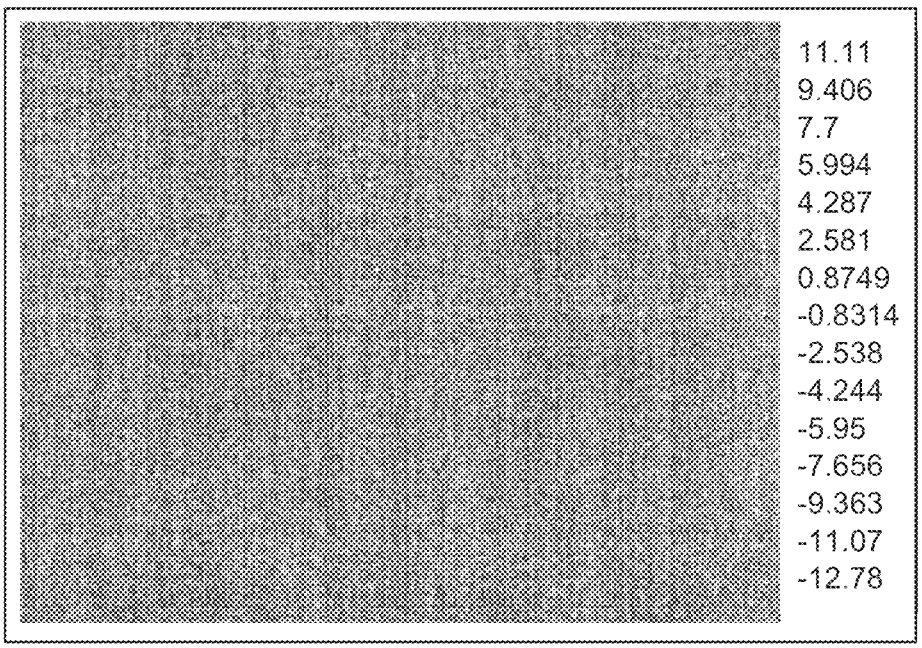
Figure 2C:
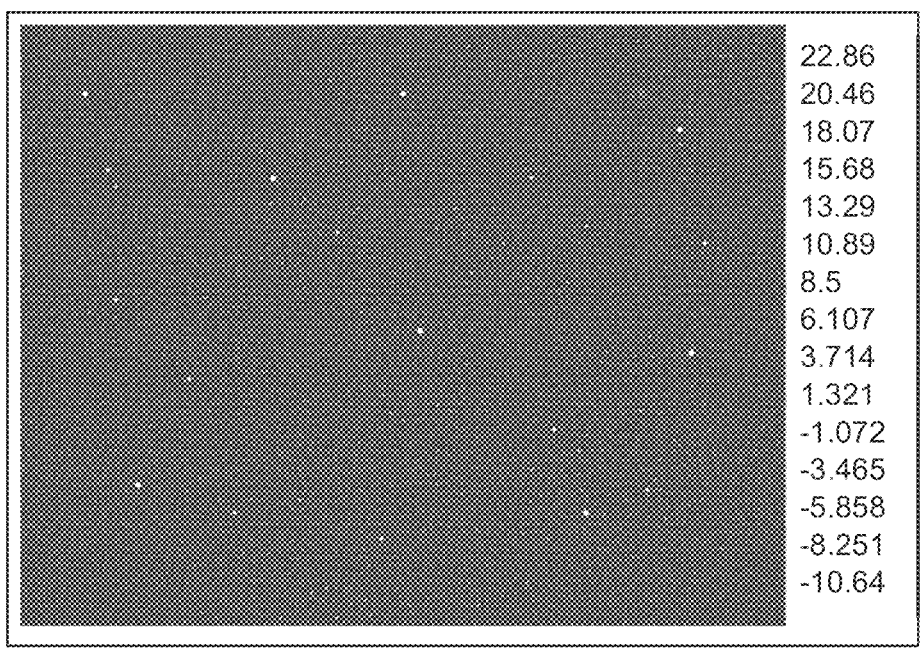
FIG. 2C illustrates an example of fixed-pattern noise in video images in accordance with one or more embodiments of the present disclosure.

FIGS. 2A-2C illustrate examples of random noise and FPN in video image data in accordance with one or more embodiments of the present disclosure. More specifically, FIGS. 2A and 2B illustrate examples of random noise extracted respectively from two consecutive video image frames, and FIG. 2C illustrates FPN that persists in a sequence of video image frames. In FIGS. 2A-2C, FPN is substantially constant (e.g., does not vary or vary only slightly) over time (e.g., over consecutive video image frames), whereas random noise may vary randomly with respect to time.

Video image data captured by many image sensors exhibit both random noise and FPN. Whereas many conventional filtering techniques simply model noise present in still or video images as random and unstructured noise, systems and methods disclosed herein advantageously model both a random noise component and an FPN component in video image data to effectively suppress both types of noise therein. In various embodiments, noise that may appear as a result of sensor defects (e.g., response non-uniformity, dead pixels, hot pixels, or other defects) may also be modeled or otherwise considered as part of FPN. Moreover, noise exhibited in still or video images captured by many image sensors is not unstructured noise. Rather, both the random component and FPN component may be correlated. That is, noise pixels in different spatial (e.g., different pixel coordinates) and temporal (e.g., in different frames) locations are not independent of one another, but rather are correlated with each other. Typical noise in video image data may therefore be referred to as colored noise, rather than white noise.

Figure 3A:
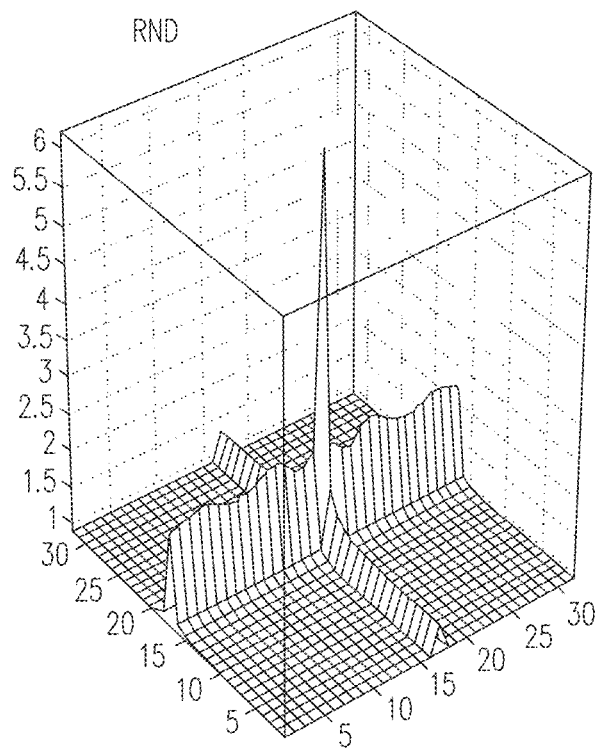
FIGS. 3A and 3B illustrate graphs representing examples of power spectral densities of random noise and fixed-pattern noise components, respectively, in accordance with one or more embodiments of the present disclosure.
Figure 3B:
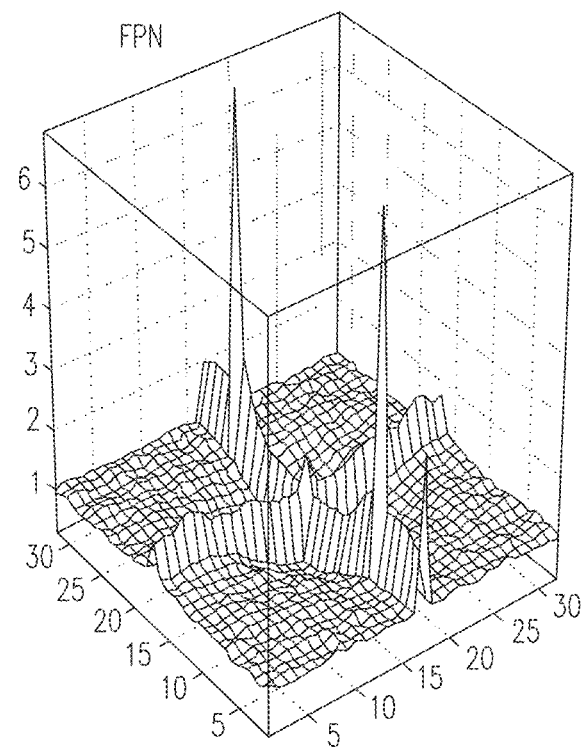

Such characteristics may be readily observed in power spectral density (PSD) graphs of example noise as shown in FIGS. 3A and 3B. More specifically, FIG. 3A shows a PSD graph of an example random noise component and FIG. 3B shows a PSD graph of an example FPN component, both of which are computed and presented with respect to a 32×32 Fourier transform and shown with a direct current (DC) term at the center. As generally known by one skilled in image processing, a PSD graph of white noise shows a substantially same constant value for all coefficients. In contrast, typical example noise in FIGS. 3A and 3B is characterized by clear and distinct non-uniform PSD graphs in both random noise and FPN components. For example, the PSD graph of random noise in FIG. 3A shows a larger horizontal correlation, which may typically be due to column noise in many types of image sensors. As may be appreciated, correlations of noise may be analyzed and expressed with respect to other transforms than the Fourier transform, for example, with respect to the DCT, various types of wavelet transforms, or other suitable transforms.

In embodiments of systems and methods disclosed herein, such structured properties (or "coloredness") of typical noise may be modeled for both random noise and FPN components, thereby permitting effective suppression of noise in video image data through a more accurate model of typical noise therein.

In one embodiment, both random noise and FPN components may be modeled as colored Gaussian noise. Experiments performed in connection with the disclosure have revealed that Gaussian distributions may be taken as good approximations for both noise components. In other embodiments, other distributions, such as a Poisson distribution or a Rician distribution, may be used in place of Gaussian distributions.

One example of random noise and FPN components modeled as colored Gaussian noise may be described mathematically as follows. Let $x_i \in X_i \subseteq Z$, $i=1, 2$, be pixel spatial coordinates and $t \in T \subseteq Z$ be a video image frame index (e.g., time index). Also, let $X=X_1 \times X_2$ and $V=X \times T$ denote, respectively, a spatial domain (e.g., directed to pixels within a video image frame) and a spatiotemporal domain (e.g., directed to a sequence of video image frames). Then, in one example, noisy video data $z:V \to R$ may be modeled as:

$$z(x_1,x_2,t)=y(x_1,x_2,t)+\eta_{RND}(x_1,x_2,t)+\eta FPN(x_1,x_2,t) \quad (1)$$

where $y:V \to R$ is an unknown noise-free video, $\eta_{RND}: V \to R$ and $\eta_{FPN}: V \to R$ are realizations of random and FPN components.

As previously indicated, in one embodiment, these two noise components may be assumed and modeled as colored Gaussian noise, $$\eta_{RND}=k_{RND}*\eta_{RND}^{white} \quad (2)$$

$$\eta_{FPN}=k_{FPN}*\eta_{FPN}^{white} \quad (3)$$

where $\rho_{RND}^{white}$ are $\eta_{FPN}^{white}$ white noise factors following independent and identically distributed (i.i.d.) Gaussian distributions such that:

$$\eta_{RND}^{white}(x_1,x_2,t) \sim N(0,\sigma_{RND}^2(t)), \text{ i.i.d. w.r.t. } x_1,x_2 \text{ and independent w.r.t. } t, \quad (4)$$

$$\eta_{FPN}^{white}(x_1,x_2,t) \sim N(0,\sigma_{FPN}^2(t)), \text{ i.i.d. w.r.t. } x_1,x_2 \text{ but not independent w.r.t. } t, \quad (5)$$

where * denotes the convolution operator, and $k_{RND}$ and $k_{FPN}$ are equivalent convolution kernels determining power spectral densities of $\eta_{RND}$ and $\eta_{FPN}$, respectively.

In various embodiments, standard deviation values $\sigma_{RND}$ and $\sigma_{FPN}$ may be estimated from video image data as further described herein. Experiments performed in connection with the disclosure have revealed that standard deviation values $\sigma_{RND}$ and $\sigma_{FPN}$, as well as FPN $\eta_{FPN}$ typically vary slowly over time. As such, standard deviation values $\sigma_{RND}$ and $\sigma_{FPN}$ may be estimated only sporadically in some embodiments.

More specifically, it may be assumed that:

$$\frac{\partial}{\partial t}\sigma_{RND}(t) \approx 0, \quad (6)$$

$$\frac{\partial}{\partial t}\sigma_{FPN}(t) \approx 0, \quad (7)$$

$$\frac{\partial}{\partial t}\eta_{FPN}(x_1,x_2,t) \approx 0, \quad (8)$$

where the approximations of these partial derivatives with respect to t are such that $\sigma_{RND}$, $\sigma_{FPN}$ and $\eta_{FPN}$ may be treated as constant with respect to t within temporal windows that are used by operations (e.g., filtering operations) described herein.

In addition, PSDs of $\eta_{RND}$ and $\eta_{FPN}$ may be assumed to be fixed modulus normalization with respect to corresponding $\sigma_{RND}^2$ and $\sigma_{FPN}^2$. That is, PSDs do not need to be estimated during operations on video image data, but rather may be treated as built-in calibration parameters in some embodiments. As such, in some embodiments, PSDs of $\eta_{RND}$ and $\eta_{FPN}$ may be estimated offline using calibration video images or any other images that may be suitable for calibration purposes, and only need to be re-calibrated periodically or as needed.

In some embodiments, Equation (1) may be generalized to incorporate a signal-dependent noise model, by having $\sigma_{RND}$ and $\sigma_{FPN}$ as functions of both y and t. Such functions may be reasonably considered as separable into independent factors as $$\sigma_{RND}(y,t)=\sigma_{RND}^{[space]}(y) \times \sigma_{RND}^{[time]}(t) \text{ and } \sigma_{FPN}(y,t) = \sigma_{FPN}^{[space]}(y) \times \sigma_{FPN}^{[time]}(t)$$

In addition, while $\sigma_{RND}$ can be further decomposed into a vertical and a horizontal component, such an anisotropy in noise may be embedded in PSD representations of noise in various embodiments, as further described herein.

It may be noted that some "bad pixels" (e.g., stuck pixels that always show a fixed value or dead pixels that never detect light) may result in impulse noise of extremely low probability, and thus may not be adequately captured by Equation (1). However, various embodiments of the disclosure contemplate incorporating simple mean/median operations based on a look-up table or other inexpensive ad-hoc procedures to compensate for such cases.

Figure 4:
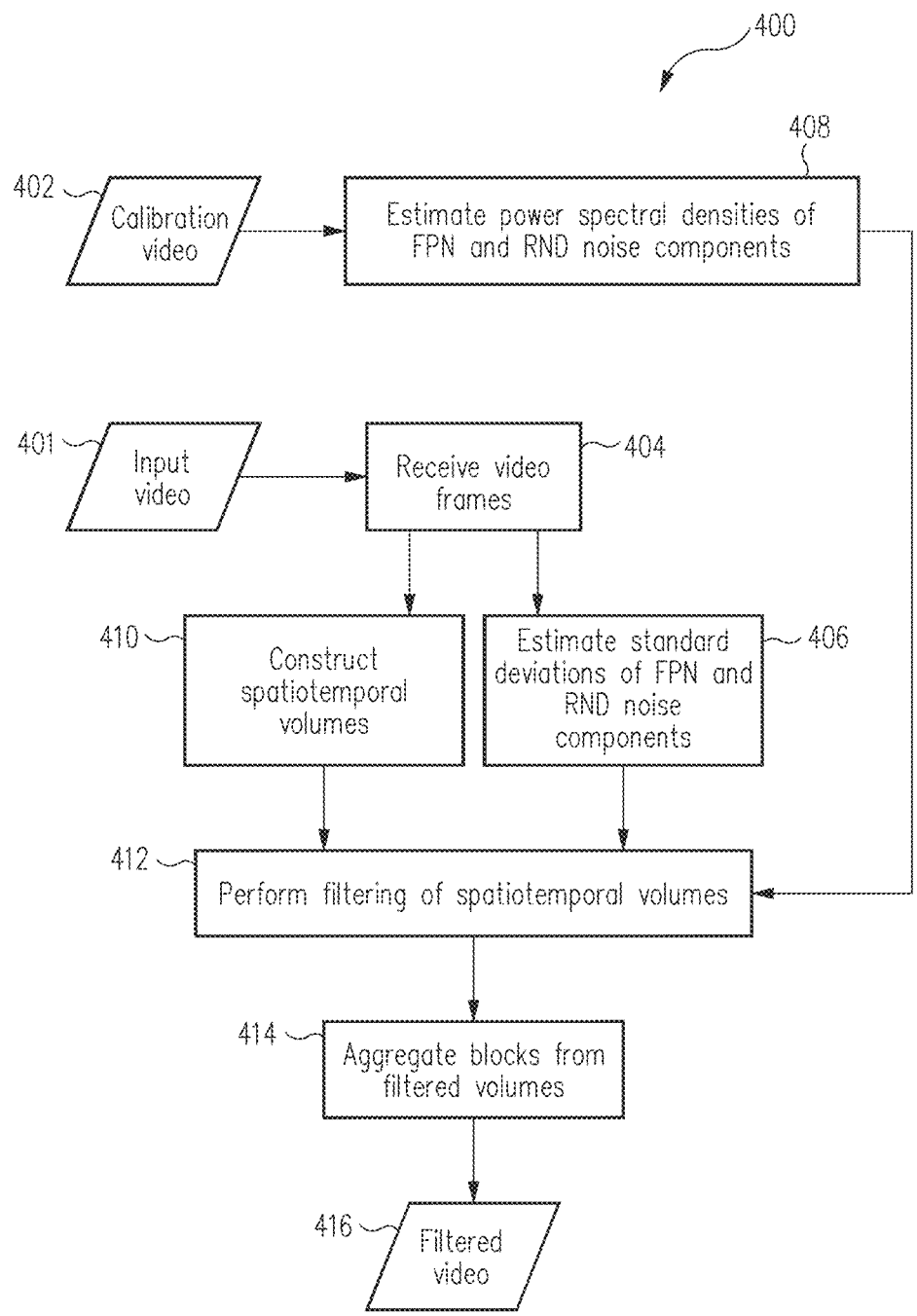
FIG. 4 illustrates a flowchart of a process to suppress noise in video images in accordance with one or more embodiments of the present disclosure.

Having described example noise models and associated noise parameters, such as standard deviation $\sigma_{RND}$, standard deviation $\sigma_{FPN}$, PSD of $\eta_{RND}$, and PSD of $\eta_{FPN}$, that may be utilized in various embodiments of systems and methods of the disclosure, a process 400 to suppress noise in video data in accordance with an embodiment of the disclosure will now be described in connection with FIG. 4. For example, process 400 may be performed by various embodiments of the imaging system 100. It should be appreciated that the imaging system 100 and various components thereof are identified only for purposes of example, and that any other suitable system may be utilized to perform all or part of process 400.

At operation 404, a plurality of video image frames (e.g., consecutive still images that may be composed to construct moving videos) may be received. For example, in an embodiment, video image data (e.g., input video 401) captured or otherwise generated by the image capture component 130 or external devices (e.g., generating video data 132) may be received at the video interface component 134 and/or the processing component 110. In some embodiments, video image data may be processed or otherwise managed to extract a plurality of video image frames therefrom, as needed or desired for particular applications or requirements. For example, the video interface component 134 and/or processing component 110 may be configured to extract a plurality of video image frames, which may then be received at the processing component 110.

At operation 406, standard deviation $\sigma_{RND}$ of random noise component and standard deviation $\sigma_{FPN}$ of FPN component may be estimated using the video image frames. For example, standard deviation $\sigma_{RND}$ of random noise component and standard deviation $\sigma_{FPN}$ of FPN component may be computed, calculated, approximated, or otherwise estimated at the processing component 110 of FIG. 1A. As discussed above, such parameters may be estimated only sporadically, for example, after filtering or otherwise processing a certain number of video image frames. As such, standard deviation estimation operations may be used within a real-time image processing pipeline if desired. In one embodiment, standard deviation estimation operations may be embedded within, for example, a noise filtering module of the processing component 110.

In various embodiments, standard deviation $\sigma_{RND}$ of random noise component may be estimated by performing a temporal high-pass filtering of the video, and calculating a median of absolute deviations (MAD) of the temporal high-pass version of the video. For example, in one embodiment, temporal high-pass filtering may be performed by obtaining the differences between one video image frame and another video image frame delayed by one frame. MAD calculations may then be performed on the temporal high-pass version of the video to obtain a robust estimation of standard deviation $\sigma_{RND}$. In other embodiments, standard deviation $\sigma_{RND}$ may be estimated in a three-dimensional (3-D) transform domain (e.g., transformed by applying a decorrelating transform for filtering as further described herein), where coefficients representing the highest temporal frequency, or some frequency higher than a threshold value, may be used as samples for MAD calculation. It is also contemplated that other known methods for temporal high-pass filtering of video image data and/or other known methods for estimating a standard deviation, may be adapted to be used with the process 400.

In various embodiments, standard deviation $\sigma_{FPN}$ may be obtained from the estimated standard deviation $\sigma_{RND}$ and an estimation of total standard deviation of both FPN and random noise components. In one embodiment, standard deviation $\sigma_{FPN}$ may be computed as:

$$\sigma_{FPN}^2 = \sigma_{RND+FPN}^2 - \sigma_{RND}^2, \quad (9)$$

where $\sigma_{RND+FPN}$ is a total standard deviation of both FPN and random components. In other embodiments, standard deviation $\sigma_{FPN}$ may be computed using other statistical criteria (e.g., maximum-likelihood) for estimating standard deviation $\sigma_{FPN}$ given standard deviation $\sigma_{RND+FPN}$ and standard deviation $\sigma_{RND}$.

In various embodiments, total standard deviation $\sigma_{RND+FPN}$ may be estimated by performing a spatial high-pass filtering of the video, and calculating a MAD of the spatial high-pass version of the video. For example, in one embodiment, spatial high-pass filtering may be performed by obtaining the differences between a video image frame and the video image frame shifted by one pixel. MAD calculations may then be performed on the spatial high-pass version of the video to obtain a robust estimation of standard deviation $\sigma_{RND+FPN}$ which in turn can be used to obtain a robust estimation of $\sigma_{FPN}$ as described above. In other embodiments, standard deviation $\sigma_{RND+FPN}$ may be estimated in a three-dimensional transform domain (e.g., transformed using a decorrelating transform for filtering as further described herein), where coefficients representing the highest spatial frequency, or some frequency higher than a threshold value, may be used as samples for MAD calculation. It is also contemplated that other known methods for spatial high-pass filtering of video image data and/or other known methods for estimating a standard deviation, may be adapted to be used with the process 400.

At operation 408, PSDs of a random noise component $\eta_{RND}$ and a FPN component $\eta_{FPN}$ may be estimated using calibration video 402 or any other video images that may be used for calibration purposes. As discussed above, PSDs of $\eta_{RND}$ and $\eta_{FPN}$ may be considered to be constant modulus normalization of $\sigma_{RND}$ and $\sigma_{FPN}$. As such, in some embodiments, operation 408 may be performed offline and/or only periodically (e.g., when recalibration may be desired or needed). In some embodiments, the calibration video 402 may provide substantially uniform video images (e.g., provided by capturing images of a closed shutter, a substantially uniform blackbody, a substantially uniform background, or other similar images) such that noise present in the calibration video 402 may be more effectively distinguished from true images. In other embodiments, estimation of PSDs may be performed using any video that contains noise distributed and correlated as typical for an image sensor that captures video images to be filtered by the process 400.

In some embodiments, PSDs of a random noise component $\eta_{RND}$ and a FPN component $\eta_{FPN}$ may be computed by performing an autocorrelation operation on the calibration video 402. In other embodiments, other suitable techniques for computing PSDs may be adapted to be used for operation 408.

In some embodiments, an actual pattern of FPN in the video image frames may be dynamically estimated, in addition to or in place of various statistical parameters associated with the FPN (e.g., a PSD $\eta_{FPN}$ and a standard deviation OF $\sigma_{FPN}$ of the FPN estimated as described herein). For one or more embodiments, the dynamically estimated FPN pattern may be subtracted from the video image frames, and from the resulting video image frames a PSD of the residual FPN (e.g., FPN remaining in the video image frames after the dynamically estimated FPN pattern is subtracted) and/or other noise may be estimated online (e.g., using the received video image frames) as opposed to being estimated offline (e.g., using calibration video 402). Such online estimation of the PSD of the residual FPN or other noise may enable noise filtering that is robust against modeling imprecisions and inaccuracies, for example.

At operation 410, spatiotemporal volumes (e.g., containing image blocks extracted from different temporal positions, such as from different video image frames) may be constructed from image blocks (e.g., image patches such as fixed-size patches or portions of a video image frame) extracted from video image frames. In various aspects of process 400, filtering and/or other processing operations may be performed on the constructed spatiotemporal volumes.

In various embodiments, spatiotemporal volumes may be constructed by extracting and stacking together image blocks from a sequence of video image frames along a motion trajectory. For example, if 8×8 image blocks are utilized in an embodiment, the constructed spatiotemporal volume may have size 8×8×N, where N is a length of a trajectory (e.g., a number of video image frames) along which motion is tracked. In some embodiments, motion trajectories may be determined by concatenating motion vectors obtained by, for example, block-matching techniques or any other suitable motion or optical flow estimation techniques. Motion vectors may be either computed from the received video image frames, or, when input video 401 is a coded video, motion vectors embedded in the coded video may be utilized. In some embodiments, the motion vectors may be utilized to assess the quality of various dynamic (e.g., instantaneous or online) estimates associated with FPN described above.

Figure 5:
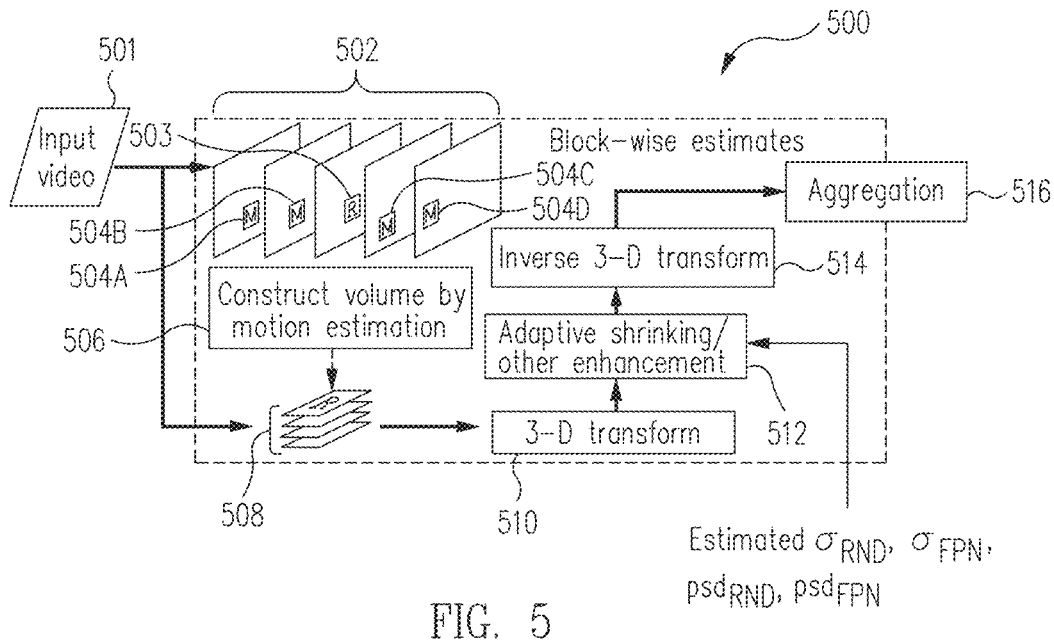
FIG. 5 illustrates a flowchart of a process to construct and filter spatiotemporal volumes to suppress noise in video images in accordance with one or more embodiments of the present disclosure.
Figure 6:
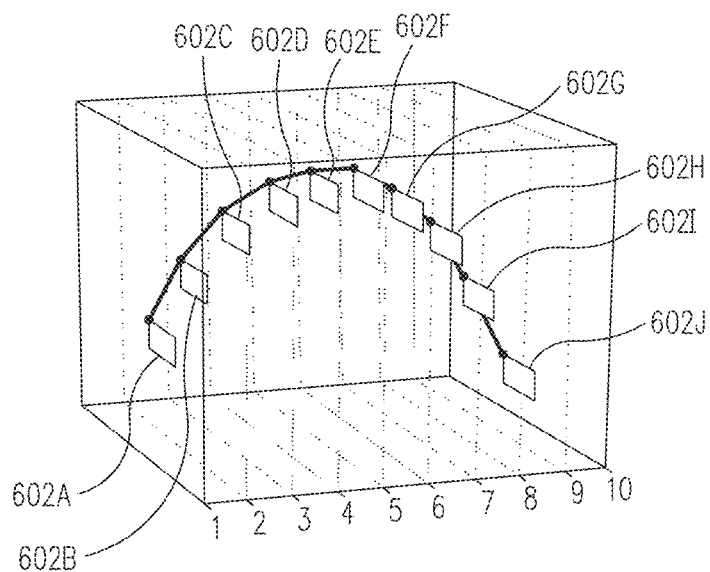
FIG. 6 illustrates an example of a motion trajectory along which image blocks may be extracted to construct a spatiotemporal volume in accordance with one or more embodiments of the present disclosure.

Referring to FIGS. 5 and 6, examples of constructing spatiotemporal volumes are further described. FIG. 5 shows a process 500 to construct and filter a spatiotemporal volume 508 to suppress noise in an input video 501 in accordance with an embodiment of the disclosure. For example, the process 500 may be performed as part of the process 400 of FIG. 4, such as at operations 410-414. FIG. 6 shows an example of a motion trajectory along which image blocks are extracted to construct a spatiotemporal volume in accordance with an embodiment of the disclosure.

As described above, block-matching techniques may be used in some embodiments to construct spatiotemporal volumes. For example, at operation 506, spatiotemporal volume 508 may be constructed using a block-matching technique. That is, a plurality of video image frames 502 may be examined to search for image blocks 504A-504D matching (e.g., meeting a certain similarity criterion) a reference image block 503. Such image blocks 503 and 504A-504D may define a motion trajectory, and may be stacked together to construct spatiotemporal volume 508. Note that operations enclosed in the dashed line (e.g., including operations 506 and 510-514) may be repeated for each reference image block to construct and filter a plurality of spatiotemporal volumes. In another example, image blocks 602A-602J in FIG. 6 may be selected as defining a motion trajectory using various motion estimation techniques. As such, images blocks 602A-602J may be extracted and stacked together to form a spatiotemporal volume of length 10, for example.

As can be seen in FIGS. 5 and 6, a spatiotemporal volume may include image blocks that may correspond to various different spatial positions on a video image. In such a case, FPN may appear substantially as random noise (e.g., not fixed to specific pixel positions because image block positions change), which may allow FPN to be modeled and filtered as such. If, however, there is little or no motion, all or a substantial portion of FPN may be preserved in the spatiotemporal volume, and as such, may be filtered based substantially on noise parameters associated with FPN. Thus, how much of FPN may be captured as random noise or preserved as FPN in spatiotemporal volumes may depend on the relative alignment of image blocks (e.g., how many of the image blocks in a spatiotemporal volume are aligned and how many of them are from other spatial locations).

Referring back to FIG. 4, at operation 412, the constructed spatiotemporal volumes may be filtered (e.g., to suppress noise or to perform other processing as further described herein with regard to operation 512). In various embodiments, the filtering may be based at least in part on one or more noise parameters. For example, in some embodiments, the filtering may be based at least in part on standard deviation $\sigma_{RND}$ of a random noise component, standard deviation $\sigma_{FPN}$ of a FPN component, PSD of a random noise component, and/or PSD of a FPN component, any one of which may be computed, calculated, approximated, or otherwise estimated at operations 406 and 408. In some embodiments, the filtering may be further adaptive to other characteristics of the constructed spatiotemporal volumes, as further described herein.

In some embodiments, filtering may be performed on 3-D transform domain representations (which may also be referred to as 3-D spectra) of the spatiotemporal volumes. For example, referring again to FIG. 5, filtering operations may include applying a three-dimensional (3-D) transform to the spatiotemporal volumes to obtain 3-D spectra (e.g., at operation 510), modifying (e.g., adaptively shrinking) coefficients of the 3-D spectra (e.g., at operation 512), and applying an inverse transform to obtain filtered spatiotemporal volumes (e.g., at operation 514). It is also contemplated that other forms of regularization such as weighted averaging or diffusion may be performed in place of or in addition to operations 510-514.

More specifically, at operation 510, a decorrelating 3-D transform may be applied to the spatiotemporal volumes. Such a decorrelating 3-D transform may include a discrete cosine transform (DCT), discrete sine transform (DST), discrete wavelet transform (DWT), discrete Fourier transform (DFT), or any other appropriate transform (e.g., separable, orthogonal transforms) that typically decorrelate image signals. In one embodiment, a DCT may be utilized for the transform operation.

A decorrelating 3-D transform may be applied by a separable cascaded composition of lower dimensional transforms. For example, for spatial decorrelation, a 2-D transform (e.g., a separable DCT of size 8×8) may be applied to each of the image blocks (e.g., having a size of 8×8) stacked in the spatiotemporal volume, and for the temporal decorrelation, a 1-D transform of length N (e.g., a 1-D DCT of length matching the length of the spatiotemporal volume) may be applied. As may be appreciated by one skilled in the art, the order of these two cascaded transforms may be reversed, leading to an identical result.

Figure 7:
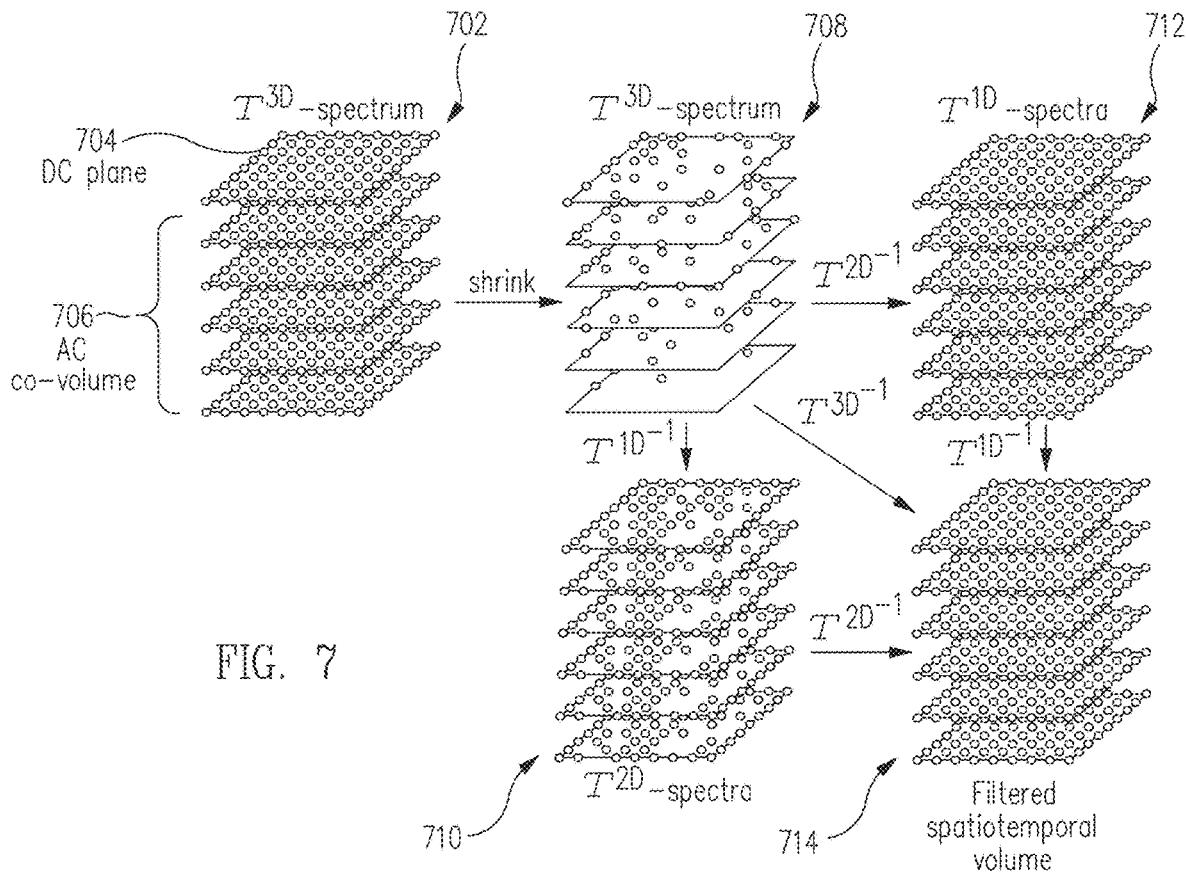
FIG. 7 illustrates a visual representation of filtering on a three dimensional spectrum of a spatiotemporal volume in accordance with one or more embodiments of the present disclosure.
Figure 8:
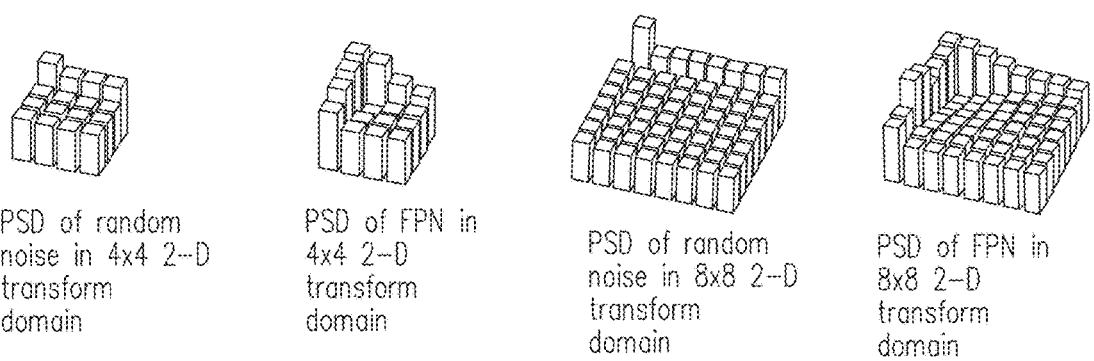
FIG. 8 illustrates various two-dimensional transform representations of examples of power spectral densities of random noise and fixed-pattern noise components in accordance with one or more embodiments of the present disclosure.

Referring also to FIG. 7, a resulting 3-D spectrum 702 may comprise a plurality of spectral coefficients (shown as small circles in FIG. 7) representing the spatiotemporal volume in the 3-D transform domain. 3-D spectrum 702 may also include a direct current (DC) plane 704 and an alternating current (AC) co-volume 706. DC plane 704 may be viewed as a collection of DC-terms, which may refer to transform domain coefficients that correspond to zero frequency and may represent an averaging of values. In this regard, the DC-terms in DC plane 704 may encode information about the FPN component. As such, in some embodiments, filtering operations may be adjusted based on which plane (e.g., DC plane or AC co-volume) the coefficients belong to, as further described herein. AC co-volume 706 may be viewed as other remaining coefficients, which typically satisfy some type of orthogonal relationship with the coefficients in DC-plane 704. It should be noted that FIG. 7 is merely a visual presentation provided for purposes of explaining filtering operations on a 3-D spectrum, and as such, the depiction of the location, size, and/or shape of 3-D spectrum 702, DC plane 704, AC co-volume 706 should not be understood as limiting a resulting 3-D spectrum.

At operation 512 of FIG. 5, shrinking (or shrinkage) may be performed to modify the coefficients of the 3-D spectrum (e.g., 3-D spectrum 702), thereby obtaining a shrunk 3-D spectrum 708. Shrinking may include thresholding (e.g., hard thresholding, soft thresholding, or others), scaling, Wiener filtering, or other operations suitable for regularizing signals in a transform domain. In various embodiments, shrinking modifies the spectral coefficients based on corresponding coefficient standard deviations of noise that may be embedded in each spectral coefficient. Thus, for example, in one embodiment, shrinking may be performed by hard thresholding the spectral coefficients based on the corresponding coefficient standard deviations (e.g., setting a value to 0 if it does not meet a threshold value). In another example, shrinking may be performed in two or more stages, in which thresholding may be performed in earlier stages to provide an estimate to Wiener filtering performed in later stages.

The coefficient standard deviation may be approximated, calculated, or otherwise obtained based on various parameters associated with a random noise component and a FPN component that may be present in video images. For example, in one embodiment, the coefficient standard deviation may be approximated based at least in part on standard deviation $\sigma_{RND}$ of a random noise component and standard deviation $\sigma_{FPN}$ of a FPN component.

In another embodiment, the coefficient standard deviation may be approximated based further on a PSD of a random noise component and a PSD of a FPN component, in addition to standard deviation $\sigma_{RND}$ and standard deviation $\sigma_{FPN}$. As described above with respect to modeling of noise in FIGS. 2A-3B and Equations (1)-(5), these PSDs may encode correlation or structure of the noise components. Thus, if computed with respect to the 2-D transform used for spatial decorrelation, these PSDs may additionally provide variances of the random noise component and the FPN component for each of the coefficients in the 2-D spectra prior to the application of the 1-D transform for temporal decorrelation. Such properties of the PSDs may be better visualized or understood through FIG. 8, which shows example graphical representations of PSDs of random noise and FPN components computed with respect to a 2-D transform used for spatial decorrelation.

In various embodiments, one or more of these and other noise parameters may be based on estimated values (e.g., estimated online and/or offline as part of the process 400). For example, the coefficient standard deviation may be approximated based on standard deviation $\sigma_{RND}$ standard deviation $\sigma_{FPN}$, a PSD of random noise component and/or a PSD of a FPN component, all or some of which may be estimated values obtained through operations 406 and 408 of FIG. 4 described above.

The coefficient standard deviations may be further adapted, refined, or otherwise adjusted based on the motion captured in the spatiotemporal volumes, in addition to being approximated or calculated based on noise parameters as discussed above. That is, in accordance with various embodiments of the disclosure, it has been observed that the relative alignment of image blocks grouped in spatiotemporal volumes affects how a FPN component is manifested in spectral coefficients. For example, in one extreme case in which all image blocks are aligned (e.g., when there is no motion), the FPN component may be same across all image blocks. As such, the FPN component may simply accumulate through averaging, and thus constitute a substantial part of the content, rather than noise, of the DC plane in the 3-D spectrum. In the other extreme case in which all image blocks are from various different spatial positions of video images, the FPN component may present different patterns over the different image blocks. As such, restricted to the spatiotemporal volume, the FPN component may appear as another random noise component.

Accordingly, in some embodiments, the coefficient standard deviations may not only be approximated based on the noise parameters, but they may also be adapted, refined, or otherwise adjusted based further on the size of the spatiotemporal volume, the relative spatial alignment of images blocks associated with the spatiotemporal volume, and/or the position of coefficients within the 3-D spectrum (e.g., whether the coefficients lie on the DC plane or the AC co-volume). In one embodiment, such an adaptive approximation of the coefficient standard deviations may be obtained using a formulation that encompasses the two extreme cases and at the same time offers a gradual transition for intermediate cases.

One example of such a formulation may be described formally as follows. For a spatiotemporal volume of temporal length N, let $L_n \leq N$, $1 \leq n \leq N$, be the number of image blocks forming the spatiotemporal volume sharing the same original spatial position as the n-th block in the volume. Let $L = \max_{1 \leq n \leq N}\{L_n\}$ (an alternative different definition, which can be more practical depending on the specific filter implementation, may be $L=L_1$). The coefficient standard deviations may then be approximated, for the coefficients in the temporal DC plane and its complementary AC co-volume as:

$$\sigma_{DC} = \sqrt{\sigma_{RND}^2 psd_{RND}^{2D_T} + \frac{L^2 + N - L}{N}\sigma_{FPN}^2 psd_{FPN}^{2D_T}}, \quad (10)$$

$$\sigma_{AC} = \sqrt{\sigma_{RND}^2 psd_{RND}^{2D_T} + \frac{N - L}{N}\sigma_{FPN}^2 psd_{FPN}^{2D_T}}, \quad (11)$$

where $\sigma_{DC}$ and $\sigma_{AC}$ are the coefficient standard deviations for coefficients in the DC plane and in the AC co-volume, respectively, and wherein $psd_{RND}^{2DT}$ and $psd_{FPN}^{2DT}$ are the PSDs of FPN and random noise components with respect to the 2-D spatial decorrelating transform. Thus, by modifying the spectral coefficients using $\sigma_{DC}$ and $\sigma_{AC}$ obtained from Equations (10) and (11), an embodiment of the disclosure may perform adaptive shrinking that may permit near-optimal filtering of noise in video images. Note that the abovementioned extreme cases are obtained in Equations (10) and (11) with L=N (no motion) or L=0 (image blocks all from different spatial positions), respectively.

Further, at operation 512, other operations may also be performed on the shrunk 3-D spectra (e.g., shrunk 3-D spectrum 708) for further processing or manipulation. For example, in one embodiment, the spectral coefficients may be further modified using collaborative $\alpha$-rooting or other techniques that sharpen and/or enhance the contrast in images by boosting appropriate ones of the spectral coefficients. In other examples, image restoration, deblurring, sharpening, equalization, super-resolution, or other operations may be performed to further modify the coefficients of the shrunk 3-D spectra. Whereas inaccurately modeled and/or sub-optimally suppressed noise often render enhancement and other operations ineffective, or worse, cause enhancement and other operations to degrade rather than improve images, near-optimal suppression of noise that may be achieved by embodiments of the disclosure may beneficially improve the efficacy of enhancement and other operations, as further illustrated herein.

At operation 514, the inverse of the decorrelating 3-D transform may be applied to the shrunk 3-D spectra to obtain filtered spatiotemporal volumes (e.g., a filtered spatiotemporal volume 714). As shown in FIG. 7, cascaded separable inverse 2-D and 1-D transforms may be applied in any order (e.g., with intermediate 2-D spectra 710 or intermediate 1-D spectra 712) to obtain filtered spatiotemporal volume 714.

At operation 414/516, image blocks from the filtered spatiotemporal volumes may be aggregated using appropriate aggregation techniques to generate filtered video image frames (e.g., filtered video 416). For example, in various embodiments, aggregation may include weighted averaging of image blocks. In some embodiments, weights for averaging may be based in part on the coefficient standard deviation. In such embodiments, the aggregating operation may benefit from the adaptive approximation of the coefficient standard deviations described above for operation 512. It may be appreciated that other operations associated with processes 400 and 500 may also benefit from the adaptivity provided by embodiments of the disclosure, if such operations are based in part on the coefficient standard deviations.

Figure 9:
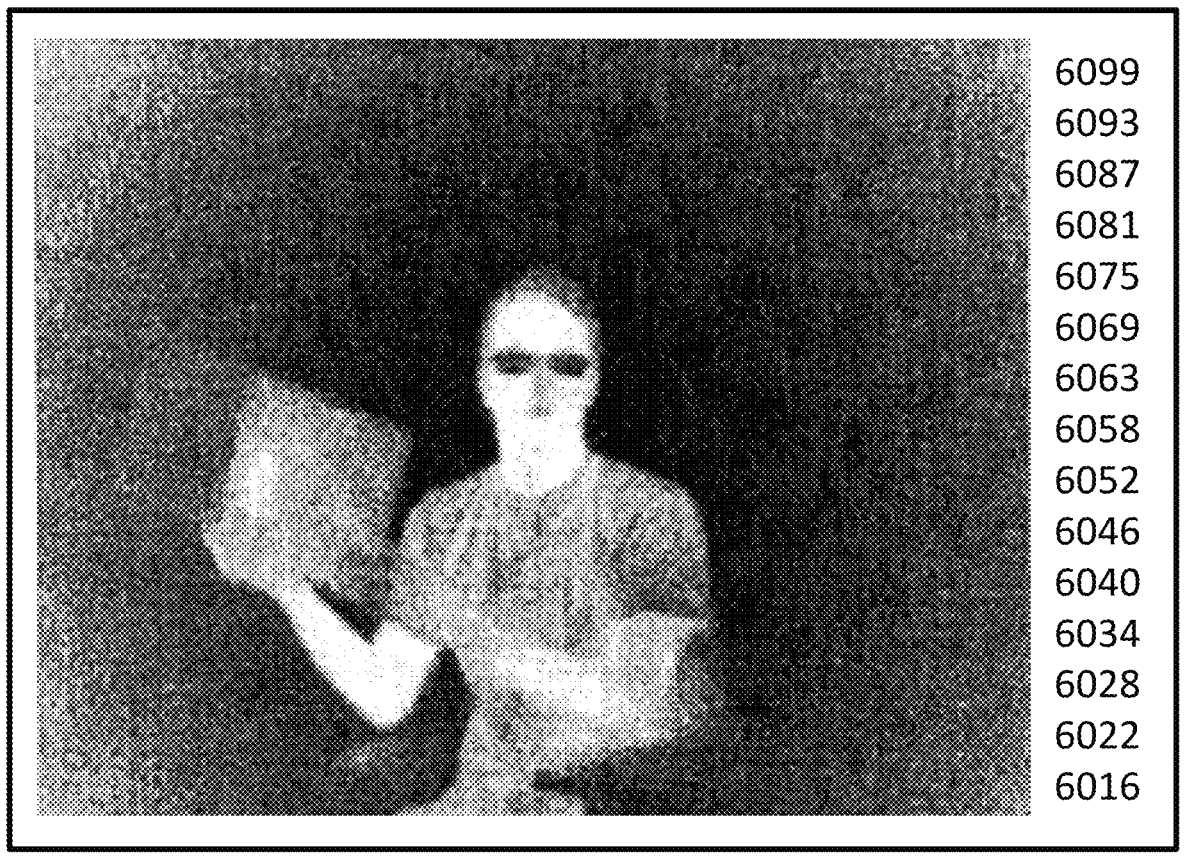
FIG. 9 illustrates an example of an input video image frame captured by an infrared imaging sensor in accordance with one or more embodiments of the present disclosure.

Referring now to FIGS. 9-11B, examples of advantageous results that may be obtained by embodiments of the disclosure are illustrated and compared with results obtained by conventional techniques. FIG. 9 shows an example of an input video image frame captured by an infrared imaging sensor. The input video image frame of FIG. 9 exhibits both correlated random noise and correlated FPN. FIG. 10A shows an example of a resulting video image frame obtained by processing the input video image of FIG. 9 using a conventional noise filtering technique. More specifically, the conventional technique utilized to obtain FIG. 10A assumes conventional additive white Gaussian noise (AWGN) model. That is, unlike various embodiments of the disclosure, there is no modeling of noise correlation/structure or modeling of separate FPN and random noise components. In FIG. 10A, this leads to ineffective noise suppression, with residual FPN and visible structured artifacts clearly visible from the resulting video image frame.

Figure 10A:
FIG. 10A illustrates an example of a resulting video image frame filtered using a conventional technique.
Figure 10B:
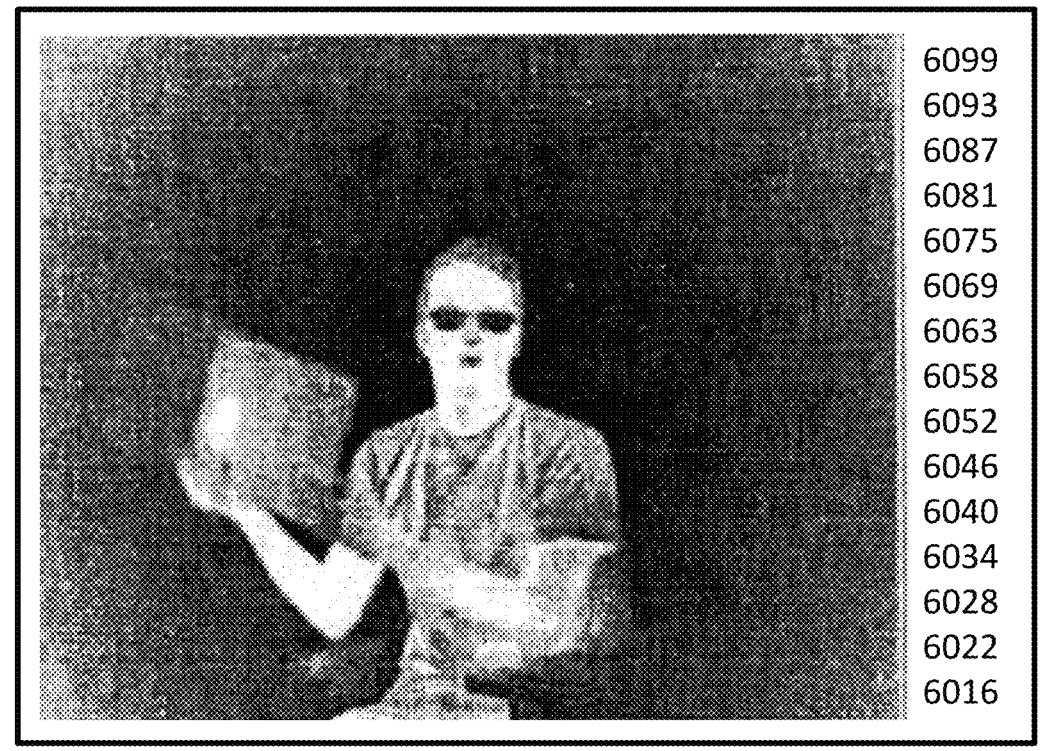
FIG. 10B illustrates an example of a resulting video image frame filtered and enhanced using a conventional technique.

Furthermore, in an example in FIG. 10B of a resulting video image frame obtained by filtering and enhancing the input video image frame of FIG. 9 using conventional techniques, performing an enhancement (e.g., sharpening and/or contrast enhancement) operation on the conventionally filtered video image frame lead to a degradation, rather than an improvement, of the video image frame, with noise being exacerbated rather than being attenuated.

Figure 11A:
FIG. 11A illustrates an example of a resulting video image frame filtered in accordance with one or more embodiments of the present disclosure.
Figure 11B:
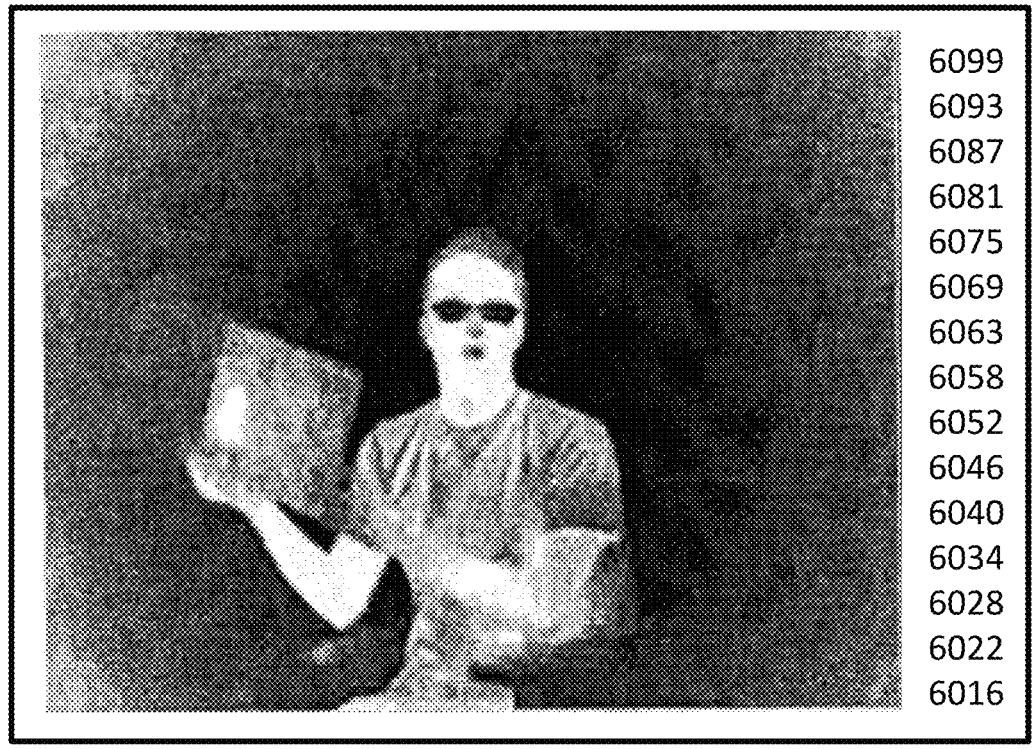
FIG. 11B illustrates an example of a resulting video image frame filtered and enhanced in accordance with one or more embodiments of the present disclosure.

In contrast, in an example in FIG. 11A of a resulting filtered video image frame obtained by filtering the input video image of FIG. 9 according to an embodiment of the disclosure, both FPN and random noise components are effectively suppressed with no structured artifacts in the resulting video image. Further, advantages of accurate modeling and filtering of noise may be appreciated even more in FIG. 11B, which shows an example of a resulting video image frame obtained by filtering and enhancing the input video image of FIG. 9 in accordance with an embodiment of the disclosure.

Therefore, some embodiments of methods and systems disclosed herein may permit effective suppression of noise even in images that have a prominent FPN component, by modeling noise more accurately, estimating one or more noise parameters, filtering images based on motion-adaptive parameters, and/or performing other operations described herein. Some embodiments of methods and systems disclosed herein may also beneficially suppress residual FPN that may still remain after conventional FPN compensation procedures, such as a column noise compensation technique, FPN removal based on pre-calibrated or dynamically estimated FPN masks, and/or other techniques, have been performed. Thus, for example, some embodiments of methods and systems disclosed herein may be included in or implemented as various devices and systems that capture and/or process video or still images impaired by noise (e.g., video or still images captured by infrared image sensors or other sensors operating at a low signal-to-noise ratio regime, and/or video or still images processed by conventional FPN compensation techniques) to beneficially improve image quality.

Based on the framework of constructing and adaptively operating on motion-based spatiotemporal volumes, additional embodiments of the present disclosure may facilitate panorama imaging in which a panoramic image may be generated from a set of images captured under continuous rotation of an imager, such as the image capture component 130 of FIG. 1A. For example, the imager may be, or may include, a thermal imager, and the captured images may be thermal images. The panoramic image may have a 360° FOV or less than 360° FOV.

Figure 12:
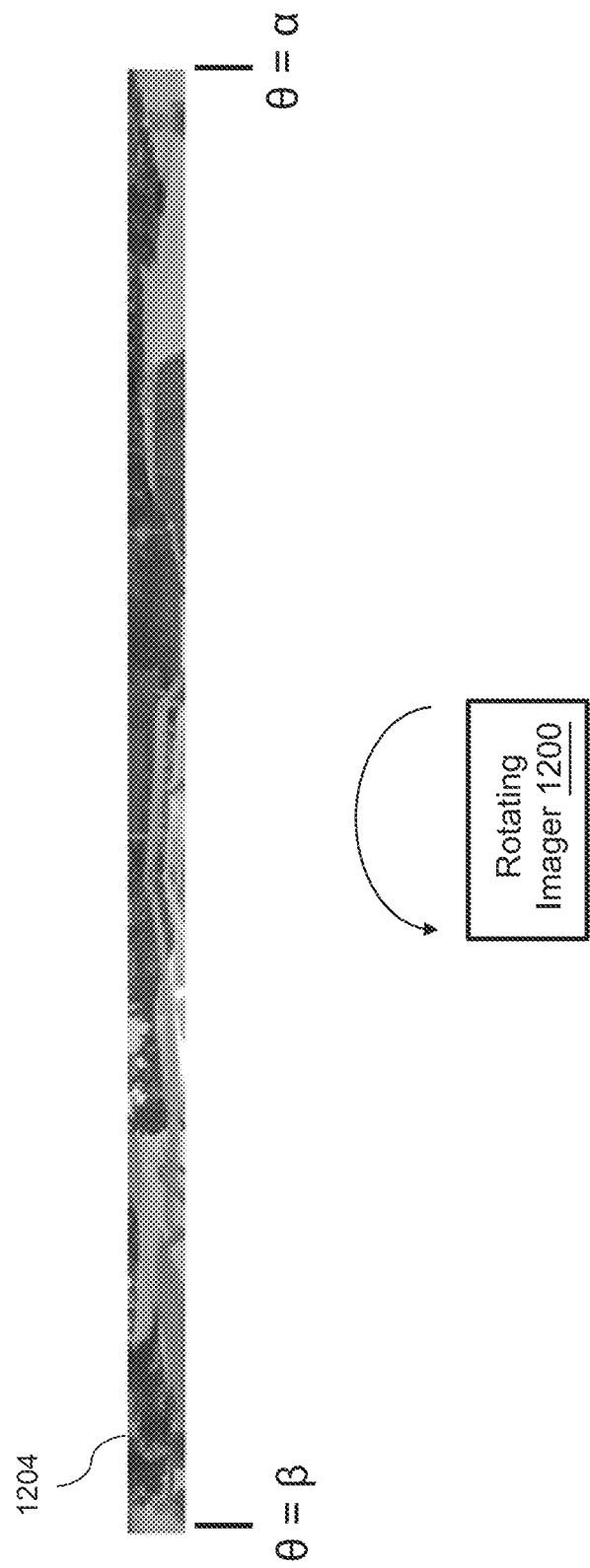
FIG. 12 illustrates an example of a panoramic image synthesized based on images captured by a rotating imager in accordance with one or more embodiments of the present disclosure.

FIG. 12 illustrates an example of a panoramic image 1204 synthesized based on images captured by a rotating imager 1200 in accordance with one or more embodiments of the present disclosure. In an embodiment, the rotating imager 1200 may be, may include, or may be a part of, the image capture component 130 of FIG. 1A. In FIG. 12, the captured images may form a series of consecutive snapshots of a scene (e.g., discrete sampling in time of a scene) captured by the rotating imager 1200. In an aspect, the series of consecutive snapshots may form a set of partially overlapping images of the scene taken at different instants in time. For example, the panoramic image 1204 may be based on tens or hundreds of images captured as the rotating imager 1200 rotates (e.g., sweeps an angular distance of up to 360°). The panoramic image 1204 encompasses an FOV that encompasses $\theta=\alpha$ to $\theta=\beta$. When the panoramic image 1204 is a 360° panoramic image, $\beta-\alpha=360°$.

Figure 13:
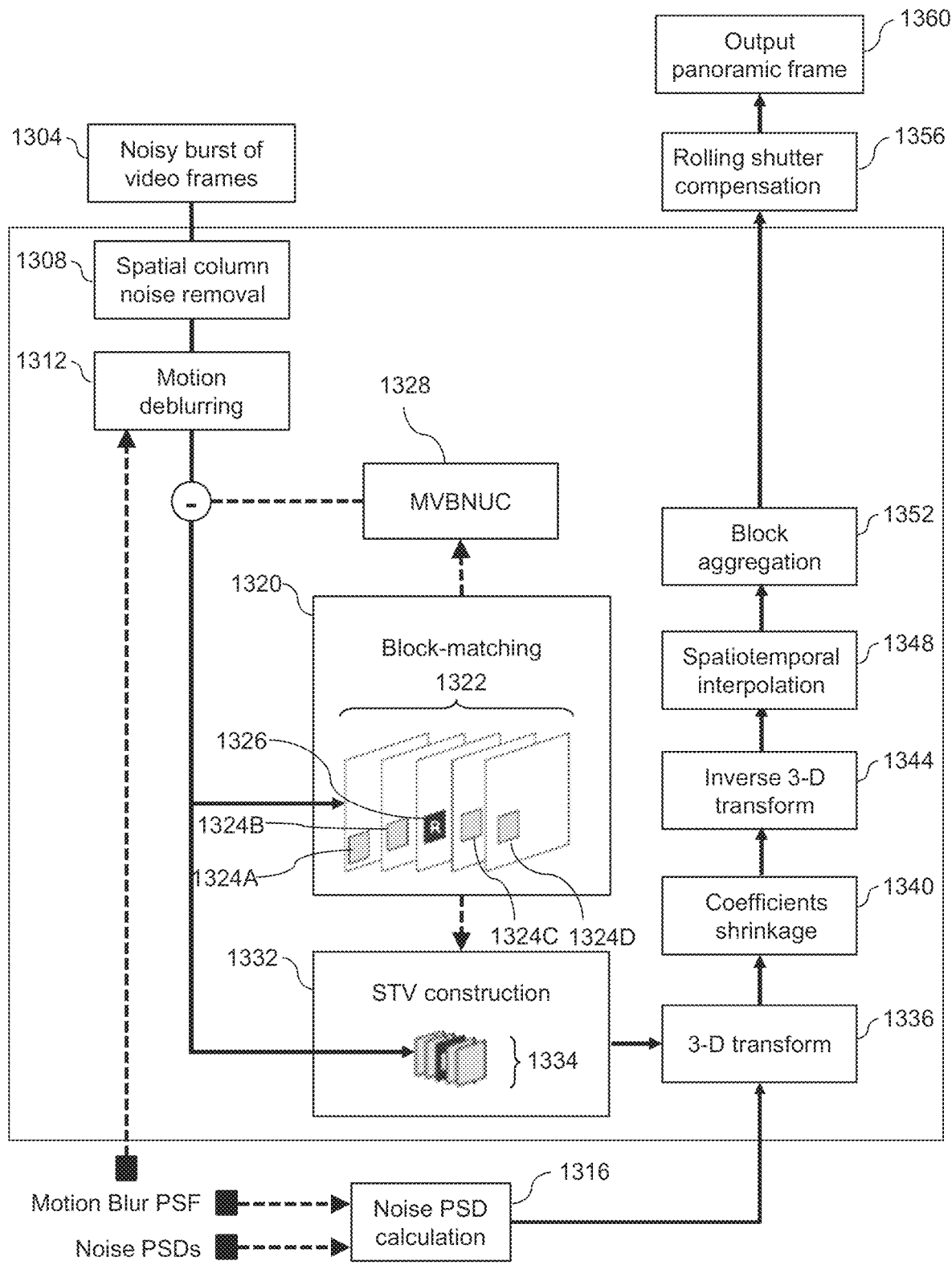
FIG. 13 illustrates a flowchart of a process to facilitate generation of panoramic images in accordance with one or more embodiments of the present disclosure.

FIG. 13 illustrates an example process 1300 to facilitate generation of panoramic images in accordance with one or more embodiments of the present disclosure. For example, the process 1300 may be performed by the embodiments of the imaging system 100. It should be appreciated that the imaging system 100 and various components thereof are identified only for purposes of example, and that any other suitable system may be utilized to perform all or part of process 1300. Note that one or more operations may be combined, omitted, and/or performed in a different order as desired. In some cases, a panoramic image frame may be a 360° FOV image frame, such as a 360° FOV thermal image frame when the video image frames provided as input are thermal image frames. In an aspect, the panoramic image 1204 of FIG. 12 may be generated by performing the process 1300 on captured video image frames.

For explanatory purposes, the process 1300 is described with reference to rotation associated with the image capture component 130 being along a horizontal direction. In an aspect, the horizontal direction may be referred to as a horizontal orientation, an azimuthal direction/orientation, or a landscape orientation. In an aspect, this example case may be referred to as a horizontal rotation case. However, the rotation associated with the image capture component 130 may be along other directions, such as a vertical direction, diagonal direction, or generally any direction. In some cases, the image capture component 130 may rotate at a constant rotation speed (or substantially constant rotation speed) when capturing the images.

The process 1300 may be considered as including multiple stages: a spatial noise removal stage, a deblurring stage (e.g., motion deblurring stage), a denoising stage, and a rotation compensation stage. In some embodiments, the process 1300 may be, or may be referred to as, an image reconstruction pipeline to generate a panoramic image frame based on multiple video image frames. In some aspects, the image reconstruction pipeline may utilize a VBM4D denoising framework. In some cases, the rotation compensation stage may be considered post-processing relative to an image reconstruction pipeline that includes the spatial noise removal stage, deblurring stage, and denoising stage.

At operation 1304, video image frames may be received. The video image frames may be referred to as a noisy burst of video frames. In an embodiment, the video image frames may be captured or generated by the image capture component 130 or external devices and provided to the video interface component 134 and/or the processing component 110. For example, the video image frames may be, or may be based on, the input video 401 of FIG. 4 or input video 501 of FIG. 5. The captured images may form a series of consecutive snapshots of a scene (e.g., discrete sampling in time of a scene). In an aspect, the series of consecutive snapshots may form a set of partially overlapping images of the scene taken at different instants in time. In some cases, the image capture component 130 may be configured to capture images with a minimum overlap of 50% between adjacent images.

In an aspect, at a first stage of the reconstruction pipeline, the spatial noise removal stage may include operation 1308. At operation 1308, spatial noise removal may be performed (e.g., by the processing component 110) on the received video image frames. For example, the processing component 110 may include a spatial noise removal module for performing the spatial noise removal. In the horizontal rotation case (e.g., rotation associated capture of the video image frames is along a horizontal direction), the received video image frames may be processed to mitigate (e.g., remove, reduce, eliminate) column noise. The spatial noise removal may be a spatial column noise removal (SCNR) performed on the video image frames. In this case, due to the characteristics of horizontal motion blur associated with the video image frames, a vertical column noise may become exaggerated and/or amplified after the deblurring stage. As such, in such cases, the SCNR stage may be performed to remove the column noise prior to performing the deblurring stage, such that the column noise is removed from images provided to the deblurring stage and thus the column noise is not exaggerated and/or amplified by the deblurring stage.

In an aspect, at a second stage of the reconstruction pipeline, the deblurring stage may include operation 1312. At operation 1312, motion deblurring may be performed (e.g., by the processing component 110) on output image data received from the spatial noise removal stage. In this regard, at operation 1312, processed video image frames output from operation 1308 may be processed to mitigate (e.g., remove, reduce, eliminate) blur. In the example horizontal rotation case, the motion deblurring stage may be performed to mitigate horizontal motion blur contributed by the horizontal rotation of the image capture component 130. As an example, the rotation of the image capture component 130 may be around a vertical axis in a counterclockwise direction, which may introduce a horizontal blur in the horizontal direction.

In some cases, an associated point spread function (PSF) may be assumed to be known. For example, the PSF may include an exponentially decaying horizontal blur. In a case that the image capture component 130 captures the video image data at a constant rotation speed, the PSF is time-invariant. In this case, the PSF, deblurring kernel, and noise PSDs after deblurring may only need to be determined (e.g., computed) once in a calibration stage. In this regard, as long as the rotation speed does not change from the rotation speed at which the PSF, deblurring kernel, and noise PSDs were determined, the PSF, deblurring kernel, and noise PSDs do not need to be re-estimated (e.g., during operations on the video image data), but rather may be treated as built-in calibration parameters.

In some embodiments, an observation model may take into consideration noise components (e.g., additive noise components) that degrade an image and a space-invariant blurring. The noise component may include a random noise component (e.g., also referred to as temporal noise) and a fixed-pattern noise component (e.g., also referred to as spatial noise). The noise components and space-invariant blurring may be modeled as a convolution of a true image with a fixed PSF:

$$z(x_1,x_2,t)=(y*v)(x_1,x_2,t)+\eta_{RND}(x_1,x_2,t)+\eta_{FPN}(x_1,x_2,t) \quad (12)$$

where z is the noise-degraded and blurred image, y is the true image, v is a blur PSF, $\eta_{RND}$ is a realization/representation of the random noise degradation, and $\eta_{FPN}$ is a realization/representation of the fixed-pattern noise degradation. The true image y is generally an unknown noise-free image to be determined (e.g., estimated) from the noise-degraded and blurred image z using the deblurring stage and denoising stage. An estimate of the true image y may be obtained based on Equation (12) by mitigating effect of the blur v using the deblurring stage and mitigating effect of the noise $\eta_{RND}$ and $\eta_{FPN}$ using the denoising stage. In this regard, the true image y may be considered an ideal image not degraded by blur and noise.

Figure 14A:
FIG. 14A illustrates a frame extract with horizontal motion blur.
Figure 14B:
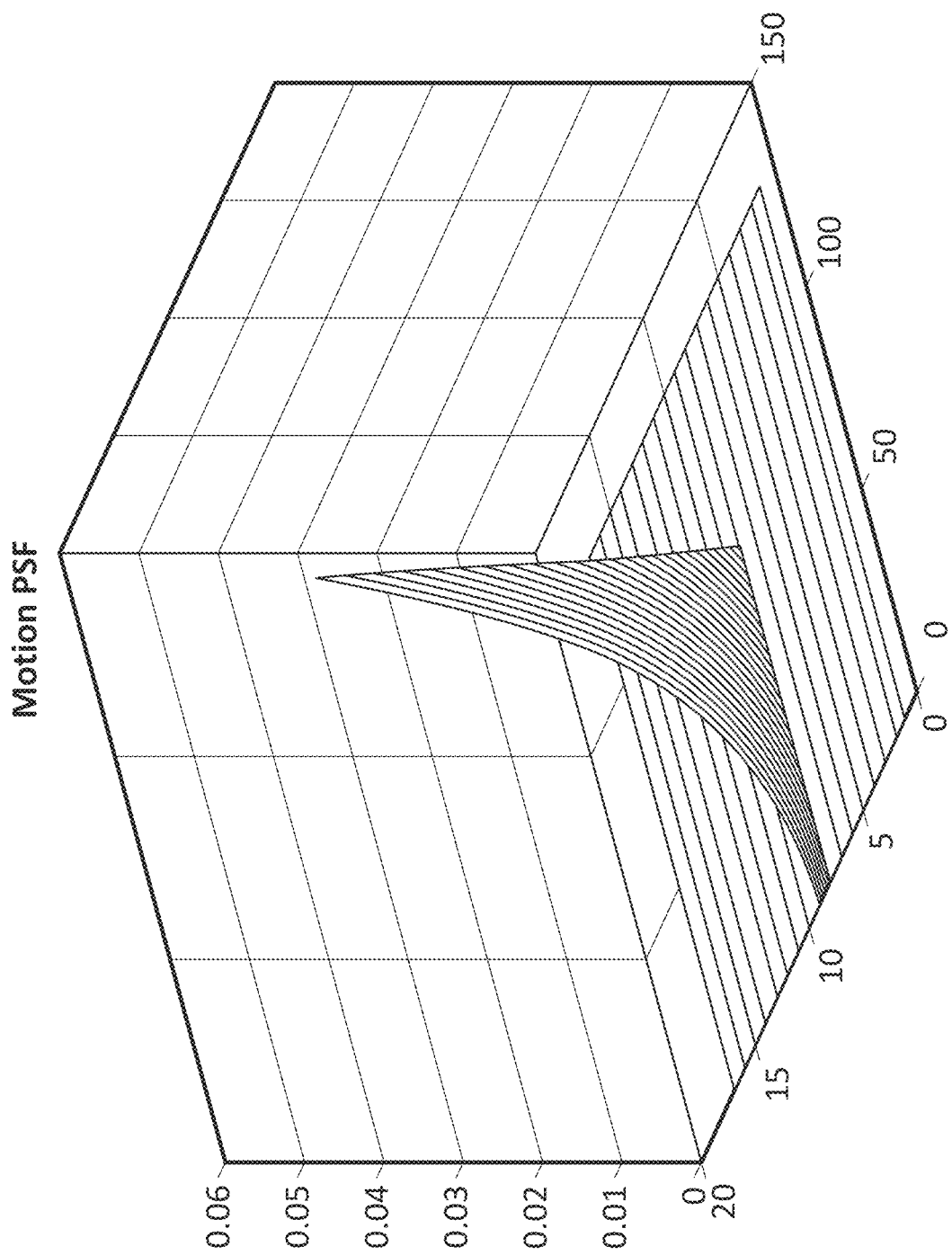
FIG. 14B illustrates a motion point spread function associated with horizontal motion blur in accordance with one or more embodiments of the present disclosure.

In an aspect, in order to incorporate motion blur, v may be modeled as:

$$v=v_b*v_m \quad (13)$$

where $v_b$ describes the PSF due to optical blur and $v_m$ describes the PSF caused by motion. For example, $v_m$ may be a one-dimensional kernel. As an example, FIGS. 14A and 14B illustrate an example of horizontal motion blur. In this regard, FIG. 14A illustrates a frame extract with horizontal motion blur and FIG. 14B illustrates an associated motion PSF.

The model of Equation (12) can be expressed in the DFT domain as:

$$Z = YV + \tilde{\eta}_{RND} + \tilde{\eta}_{FPN} \tag{14}$$

where $Z$, $Y$, $V$, $\tilde{\eta}_{RND}$, and $\tilde{\eta}_{FPN}$ are the DFT spectra of $z$, $y$, $v$, $\eta_{RND}$, and $\eta_{FPN}$, respectively (i.e., $Z=\mathcal{F}\{z\}$, $V=\mathcal{F}\{v\}$, $\tilde{\eta}_{RND}=\mathcal{F}\{\eta_{RND}\}$, and $\tilde{\eta}_{FPN}=\mathcal{F}\{\eta_{FPN}\}$). The noise components can be expressed in the DFT domain as the root PSD Q scaled by the noise variance $\varsigma$, $\tilde{\eta}_{RND} = \varsigma_{RND} Q_{RND} \eta$ and $\tilde{\eta}_{FPN} = \varsigma_{FPN} Q_{FPN} \eta$, where $\eta$ is white noise of standard deviation $\sigma=1$.

In some aspects, the implemented deblurring stage may include a regularized inversion, which may be followed by denoising. As an example, a regularized inverse (RI) for the model presented in Equation (12) can be determined in the DFT domain, and a similar deconvolution model can be provided by:

$$T^{RI} = \frac{\overline{V}}{|V|^2 + \alpha_{RI}|X|(\varsigma_{RND}^2|Q_{RND}|^2 + \varsigma_{FPN}^2|Q_{FPN}|^2)} \tag{15}$$

$$z^{RI} = \mathcal{F}^{-1}\{T^{RI}Z\} = \mathcal{F}^{-1}\{T^{RI}YV\} + \mathcal{F}^{-1}\{\tilde{\eta}_{RND}T^{RI}\} + \mathcal{F}^{-1}\{\tilde{\eta}_{FPN}T^{RI}\} \tag{16}$$

where $\alpha_{RI}$ is a regularization parameter determined empirically and $|X|$ is the cardinality of the set X (e.g., number of pixels in the video frame). Although Equation (15) utilizes a Tikhonov Regularization, other types of regularizations may be utilized. Based on the regularization utilized in Equation (15), the regularized inverse $z^{RI}$ is composed by the sum of a biased estimate of y, $\mathcal{F}^{-1}\{T^{RI}YV\}$:

$$\mathcal{F}^{-1}\{T^{RI}YV\} = \mathcal{F}^{-1}\left\{\frac{|V^2|}{|V|^2 + \alpha_{RI}|X|(\varsigma_{RND}^2|Q_{RND}|^2 + \varsigma_{FPN}^2|Q_{FPN}|^2)}Y\right\} \tag{17}$$

and two colored noise components $\mathcal{F}^{-1}\{\tilde{\eta}_{RND}T^{RI}\}$ and $\mathcal{F}^{-1}\{\tilde{\eta}_{FPN}T^{RI}\}$ provided by:

$$\mathcal{F}^{-1}\{\tilde{\eta}_{RND}T^{RI}\} = \mathcal{F}^{-1}\left\{\frac{\varsigma_{RND}\overline{V}Q_{RND}}{|V|^2 + \alpha_{RI}|X|(\varsigma_{RND}^2|Q_{RND}|^2 + \varsigma_{FPN}^2|Q_{FPN}|^2)}\eta\right\} \tag{18}$$

$$\mathcal{F}^{-1}\{\tilde{\eta}_{FPN}T^{RI}\} = \mathcal{F}^{-1}\left\{\frac{\varsigma_{FPN}\overline{V}Q_{FPN}}{|V|^2 + \alpha_{RI}|X|(\varsigma_{RND}^2|Q_{RND}|^2 + \varsigma_{FPN}^2|Q_{FPN}|^2)}\eta\right\} \tag{19}$$

In some embodiments, the optical blur PSF is assumed to be a Dirac's delta, in which case the only component of the blur comes from the motion, resulting in a one-dimensional kernel. In this case, Equation (13) may be provided by:

$$v = \delta * v_m = v_m \tag{20}$$

In other embodiments, one or more additional optical blur components may be provided in the model provided by Equation (13). In such embodiments, the convolution of Equation (13) is no longer one-dimensional.

Figure 15A:
FIGS. 15A and 15B illustrate a frame before and after regularized inversion of blur, respectively, in accordance with one or more embodiments of the present disclosure.
Figure 15B:

In some embodiments, the deconvolution in Equation (16) may produce changes in the noise characteristics, such as shown for example in FIGS. 15A and 15B. FIGS. 15A and 15B illustrate a frame before and after regularized inversion of blur, respectively, in accordance with one or more embodiments of the present disclosure. As shown in comparing FIGS. 15A and 15B, the noise in the acquired frame of FIG. 15A changes its characteristics after the deblurring process. With the noise characteristics changed, original PSDs (e.g., previously determined PSDs) for the RND and FPN components may no longer be applicable for denoising. In some cases, new PSDs in the block-DCT domain may be determined by finding variances of coefficients of the block-DCT $\sigma_{RND}^2(i)$ for $i=1, \ldots, N_b^2$, where $N_b$ is the size of the two-dimensional transform (e.g., block size). These may be expressed as:

$$\sigma_{RND}^2(i) = \frac{\varsigma_{RND}^2}{|X|}\|T^{RI}Q_{RND}\mathcal{F}\{\psi_{\mathcal{T}_{2D}}^{(i)}\}\|_2^2, \forall i = 1, \ldots, N_b^2 \tag{21}$$

and $$\sigma_{FPN}^2(i) = \frac{\varsigma_{FPN}^2}{|X|}\|T^{RI}Q_{FPN}\mathcal{F}\{\psi_{\mathcal{T}_{2D}}^{(i)}\}\|_2^2, \forall i = 1, \ldots, N_b^2 \tag{22}$$

where $\mathcal{T}_{2D}$ is the block-DCT transform used in the denoising process and $\psi_{\mathcal{T}_{2D}}^{(i)}$ is the $i^{th}$ basis element of $\mathcal{T}_{2D}$.

In a case that the image capture component 130 captures the video image data at a constant rotation speed, the motion-dependent PSF does not change in time. As such, the calculation of the new PSDs may need to be done only once as a calibration step. For example, at operation 1316, the new PSDs may be determined. In this regard, for constant rotation speed, the PSDs do not need to be estimated during operations on video image data, but rather may be treated as built-in calibration parameters in some embodiments. If there is any change in the rotation speed, new PSDs may need to be determined.

In the case of a constant rotation speed, the motion-dependent PSF does not change in time, and the regularized inverse transfer matrix $T^{RI}$ remains the same. In some cases, the deconvolution operation needed to obtain $z^{RI}$, described in Equation (13), can be performed either as a multiplication in the Fast Fourier Transform (FFT) domain or in the image domain by a convolution operation:

$$z^{RI} = z * t^{RI} \tag{23}$$

where $t^{RI}$ is the impulse response of the RI transfer matrix described in Equation (12), $$t^{RI} = \tag{24}$$

$$\mathcal{F}^{-1}\{T^{RI}\} = \mathcal{F}^{-1}\left\{\frac{\overline{V}}{|V|^2 + \alpha_{RI}|X|(\varsigma_{RND}^2|Q_{RND}|^2 + \varsigma_{FPN}^2|Q_{FPN}|^2)}\right\}$$

Figure 16:
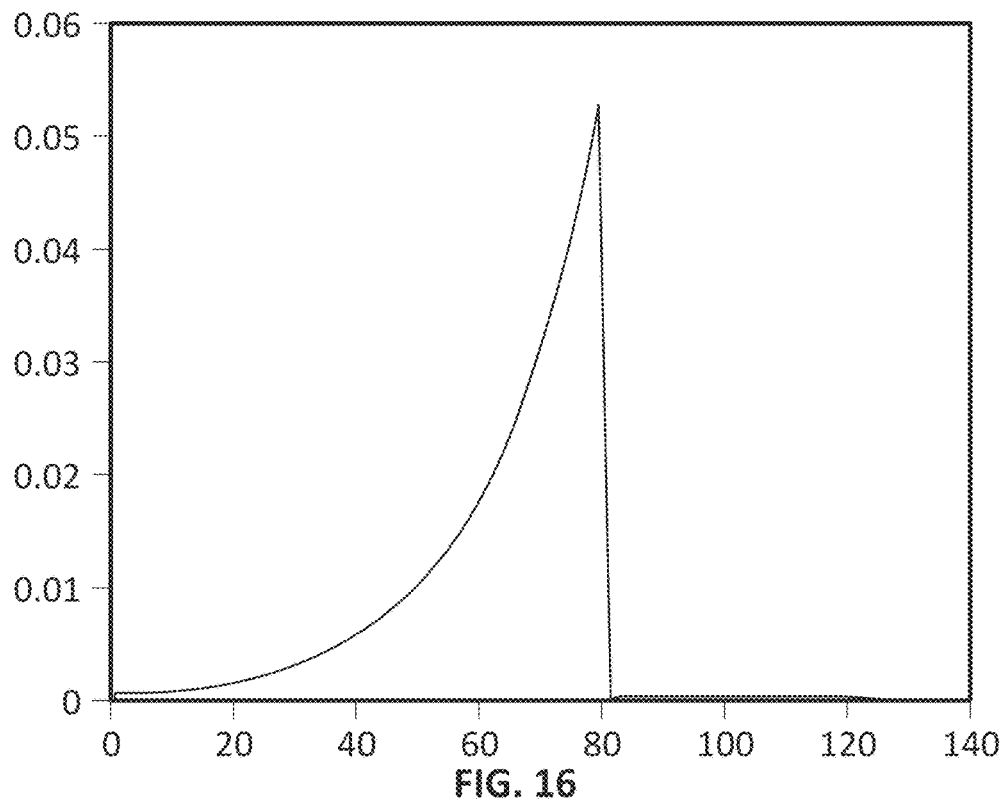
FIG. 16 illustrates an example of a motion point spread function in accordance with one or more embodiments of the present disclosure.
Figure 17:
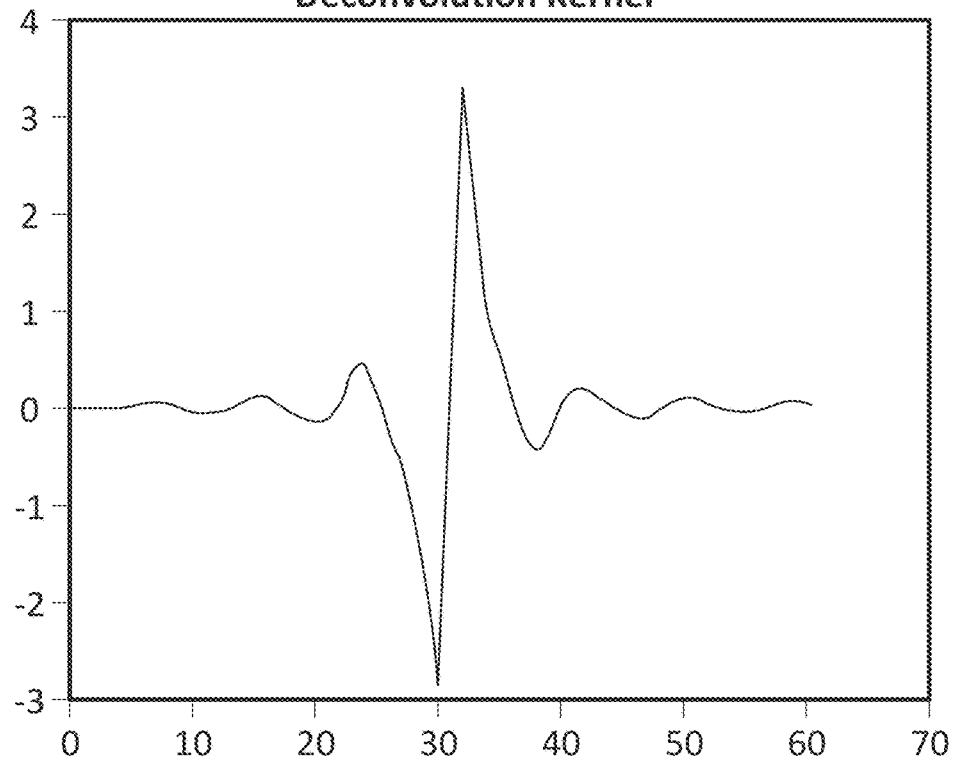
FIG. 17 illustrates an example of a deblurring kernel in accordance with one or more embodiments of the present disclosure.

In the example horizontal rotation case, the PSF is purely horizontal. In this case, the deconvolution operation can be done as a one-dimensional convolution against the convolution kernel, which is the impulse response $t^{RI}$, as shown in FIGS. 16 and 17. FIG. 16 illustrates an example of a motion PSF $v_m$ in accordance with one or more embodiments of the present disclosure. FIG. 17 illustrates an example of a deblurring kernel $t^{RI}$ in accordance with one or more embodiments of the present disclosure. It is noted that ghost artifacts may appear in the deblurred sequence if the length of the support of the deconvolution kernel is not sufficient.

In an aspect, a third stage of the reconstruction pipeline includes a denoising stage. Output video image data (e.g., deblurred image data) from operation 1312 may be processed by the denoising stage to mitigate (e.g., remove, reduce, eliminate) noise, including random noise and fixed-pattern noise. In some cases, the denoising previously described above may be applied. In some cases, the denoising may be based on a VBM4D denoising pipeline (e.g., the denoising pipeline described for FIGS. 2A through 11B or a modified version thereof). As further described below, the denoising stage may operate in a sliding temporal window manner, where, for a given image, past and future images may be used in a collaborative filtering approach. In this regard, the denoising stage may utilize a spatiotemporal filter. For example, the filter may be a block-based spatiotemporal filter that uses motion vectors obtained by block-matching to track trajectories of blocks along a temporal window spanning overlapping portions of adjacent images. In some cases, the spatiotemporal filter may be implemented using a VBM4D approach or a modified version thereof. Operations 1320, 1328, 1332, 1336, 1340, 1344, 1348, and 1352 may be considered as part of the denoising stage.

At operation 1320, block-matching may be performed to facilitate subsequent construction of spatiotemporal volumes. Block-matching may be utilized to track blocks along overlapping sections of past and future frames, and the positions of the best matches may be stored in a table (e.g., referred to as a match table). With each new frame arrival, a set of reference blocks may be selected from a reference image. A reference block may be a block used as reference in block-matching to create a spatiotemporal volume. For each reference block, similar blocks (e.g., meeting a certain similarity criterion) may be found in past and future frames. For example, video image frames 1322 may be examined to search for image blocks 1324A-1324D matching (e.g., meeting a certain similarity criterion) a reference image block 1326. In this example, it is noted that the image blocks 1324A and 1324B may be from past frames and image blocks 1324C and 1324D may be from future frames. It is noted that frames may be referred to as future frames or past frames based on their temporal position along a motion trajectory relative to a temporal position associated with a reference frame. In some cases, denoising complexity may be based on an adjustable parameter indicative of a distance (e.g., in pixels) taken between consecutive reference blocks. A smaller distance may be associated with finer denoising but higher complexity (e.g., higher number of operations). At operation 1328, a motion vector base non-uniformity correction (MVBNUC) may be performed to estimate non-uniformity (e.g., spatial noise). The MVBNUC may be performed by an MVBNUC module of the processing component 110.

As such, a sliding temporal window manner may be utilized, in which, for a given image, past and future images may be utilized. Images contained within the temporal window may be stored in a buffer (e.g., referred to as a block buffer), where possible blocks (e.g., all possible blocks) belonging to the images may be transformed. For example, the blocks may be transformed by applying two separable one-dimensional transforms and stored in a vectorized form. Block trajectory computations by means of block-matching may be utilized in order to track blocks along the temporal window. Positions in the block buffer of matches (e.g., best matches) may be stored in a table (e.g., referred to as a match table). In some cases, longer temporal windows may be associated with higher denoising quality but a higher number of operations. In an embodiment, an overlap between consecutive captured frames may determine a useful length of the temporal window. For example, the temporal window may be provided as an array with a number of past and future frames (e.g., $[N_{past}, N_{future}]$). In some cases, with 50% overlap between any given frame, the frame overlaps with a previous and/or next frame, such that a useful temporal window may be provided by [1, 1].

In a case with a constant horizontal shift between consecutive images, the fact that there is a constant horizontal shift may be leveraged to center the search window by a corresponding horizontal offset, and to stop the search accordingly when there is no more overlap between the reference image and the past and future images being searched. A multi-scale block-matching approach may be used here, such as in a coarse-to-fine manner, block-matching may first be applied on a downscaled version of the frames and the results are used as a prediction in the next finer scale.

Results of the block-matching at operation 1320 may be provided to a collaborative filtering stage. The collaborative filtering stage may be implemented by operations 1332, 1336, 1340, 1344, 1348, and 1352. At operation 1332, spatiotemporal volumes may be constructed based on the results of the block-matching. For example, the reference image block 1326 and the image blocks 1324A-1324D may define a motion trajectory, and may be stacked together to construct a spatiotemporal volume 1334. In an aspect, single spatiotemporal volumes may be created by retrieving/extracting and stacking blocks (e.g., indexes found in the match table), with each volume being formed by a respective set of stacked blocks. In this regard, the entries (e.g., values) stored in the match table may be used to create single spatiotemporal groups by retrieving the corresponding blocks from the block buffer. For example, in one implementation, each column in the match table may contain the indices in the block buffer needed to retrieve the blocks that form the spatiotemporal volume. The extracted blocks (e.g., on which the 2-D transform has already been applied in some cases) are stacked to form a spatiotemporal volume of temporal length $N \in [1, N_t]$, and are decorrelated in temporal direction by applying a one-dimensional transform of length N along the third dimension of the volume. In addition, in some cases, original spatiotemporal coordinates of the blocks may be used to create the trajectory of the spatiotemporal volume, which may later be used in spatiotemporal interpolation. If the selected transform for temporal decorrelation requires it (e.g., Haar transform), the length of the group may be restricted to have a length of power of 2 (e.g., $N=2^k$ where k may be an arbitrary positive integer).

At operation 1336, a 3-D transform may be applied to the spatiotemporal volumes to obtain 3-D spectra. At block 1340, a shrinkage of the 3-D spectra of the spatiotemporal volumes may be performed. In some aspects, thresholds associated with the shrinkage may depend on a noise standard deviation and PSD matrix. For example, the 3-D spectra may be shrunk by hard-thresholding to modify spectra coefficients (e.g., modify an amplitude of the spectra coefficients) based on the standard deviation of the noise in each coefficient. The thresholds may be determined using the PSD matrix (e.g., which captures both FPN and RND noise components) and its corresponding scaling factor (e.g., the scaling factor scales the PSD). The scaling factor may be a standard deviation of noise after the deblurring stage. The number of retained non-zero coefficients may be used to determine the weight of the spatiotemporal volume for convex combination. In some cases, a level of shrinkage of the 3-D spectra may be an adjustable parameter. For example, higher values for the parameter may result in stronger denoising and smoothing.

In some denoising implementations, during a hard-thresholding stage, variances of the transformed spatiotemporal group may be determined adaptively depending on the relative spatial position of the blocks forming the group and the PSDs of the RND and FPN components. The determination of the variances may be performed to compensate for the FPN, which accumulates into the DC plane of the group when the blocks forming the group share the same spatial coordinates. In an application of the filter in the horizontal rotation case, a constant shift exists between consecutive images and thus blocks forming a group generally do not share the same spatial coordinates. In this manner, within the spatiotemporal groups, the FPN component may be considered as another random component (e.g., such as the temporal noise component). Due to this, only one PSD and scaling coefficient (e.g., standard deviation of noise after the deblurring stage), formed as a linear combination of the RND and FPN PSDs, is used for denoising. In some cases, the MVBNUC performed at operation 1328 handles estimating the non-uniformity (e.g., spatial noise).

At operation 1344, an inverse 3-D transform may be applied to the shrunk 3-D spectra to obtain filtered spatiotemporal volumes. At operation 1348, a spatiotemporal interpolation may be performed. An example of the operation 1348 is provided in FIG. 18, which illustrates an example process 1800 for spatiotemporal interpolation in accordance with one or more embodiments of the present disclosure. For example, the process 1800 may be performed by the embodiments of the imaging system 100. It should be appreciated that the imaging system 100 and various components thereof are identified only for purposes of example, and that any other suitable system may be utilized to perform all or part of process 1800. Note that one or more operations may be combined, omitted, and/or performed in a different order as desired.

As previously indicated, the acquired images from a rotatable imager (e.g., the image capture component 130) may form a series of consecutive snapshots of a scene (e.g., discrete sampling in time of a scene). The series of consecutive snapshots may form a set of partially overlapping images of the scene taken at different instants in time. While the images are acquired in discrete time, the panoramic image is generally synthesized in a space-time continuous manner such that moving objects in the scene show continuous motion.

To facilitate synthesis of the panoramic image in a space-time continuous manner, at operation 1804, a global spatiotemporal line may be defined in a space-time reference frame. The global spatiotemporal line may be referred to as a global spatiotemporal reference line, spatiotemporal reference line, or simply a reference line. In some cases, the global spatiotemporal line may be, or may be considered to be, a virtual space-time line that provides a synthesis reference for creating a panoramic image. In this regard, the global spatiotemporal line may be a continuous line in a space-time coordinate system where the panoramic image is to be synthesized. For each of the spatiotemporal volumes created, the intersection (if any) between the block trajectory and the global spatiotemporal line may be determined and used to interpolate the corresponding block that lies on the intersection point. In some cases, the global spatiotemporal line may generally be defined in any manner to allow intersection of the global spatiotemporal line with the images (e.g., all the images) and facilitate computation. In an embodiment, the global spatiotemporal line may be linear, piecewise linear, or other continuous shape.

Figure 19:
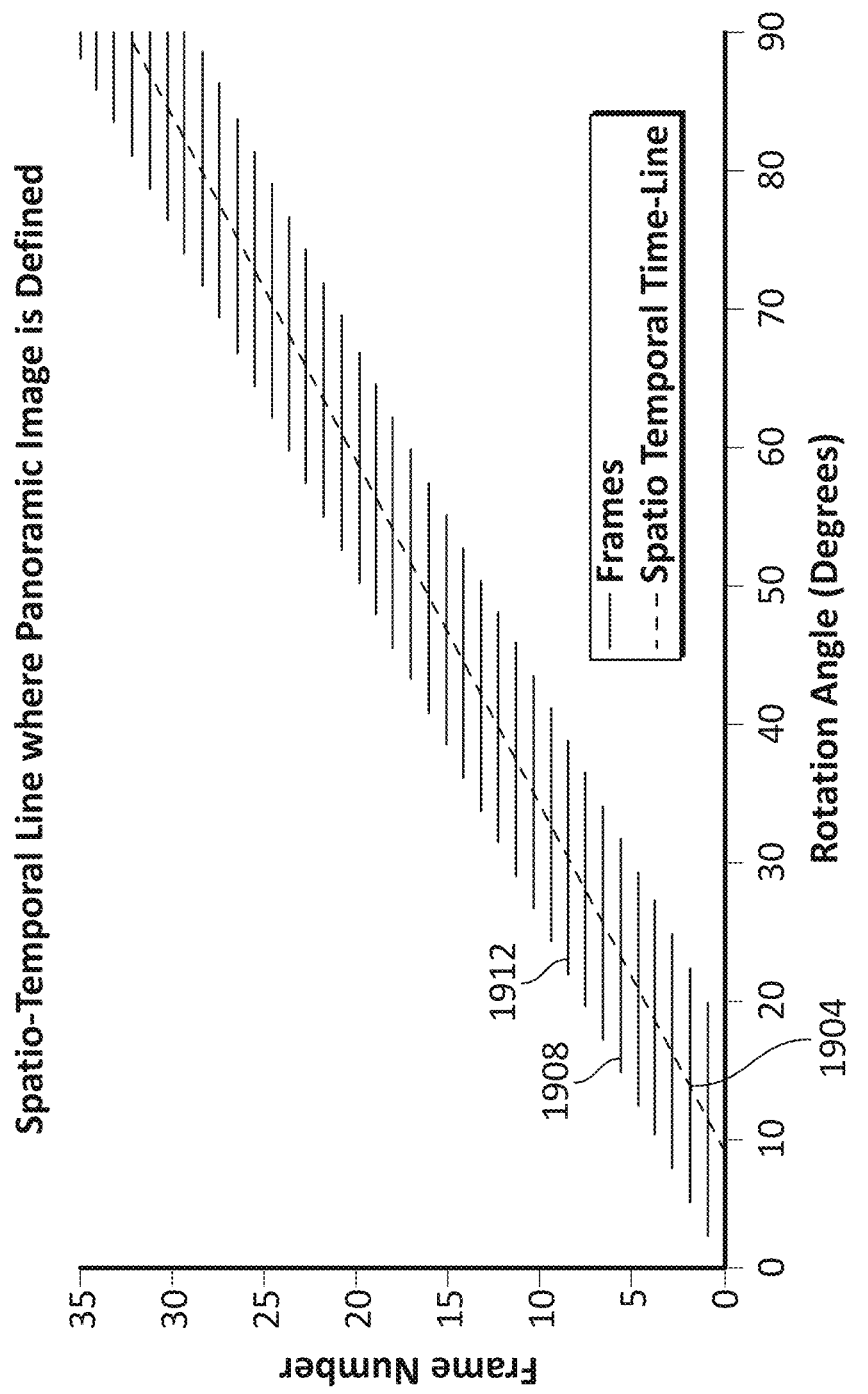
FIG. 19 illustrates an example of a global spatiotemporal line and image frames provided on the global spatiotemporal line in accordance with one or more embodiments of the present disclosure.

For example, FIG. 19 illustrates an example of a global spatiotemporal line 1904 and image frames (e.g., 1908, 1912) provided on the global spatiotemporal line 1904 in accordance with one or more embodiments of the present disclosure. The global spatiotemporal line 1904 is provided as a function of time and rotation angle. In FIG. 19, different frames are acquired at different discrete instants in time (e.g., along vertical axis). The global spatiotemporal line 1904, which is continuous in the space-time reference frame, may be used as the reference for synthesizing the panoramic frame using spatiotemporal interpolation of each of the spatiotemporal volumes.

Referring back to FIG. 18, at operation 1808, trajectory interpolation may be performed. In some aspects, the trajectory described by the spatiotemporal volumes may be expressed as a curve in the complex plane. The interpolation of the trajectory to obtain the position of the synthesized block may be performed by way of adaptive orthonormal basis representation. To this end, transform matrices may be constructed. A first transform matrix may be constructed to allow trajectory analysis given the sampling points provided by positions of blocks forming a spatiotemporal volume. A second transform matrix may be used for interpolated trajectory synthesis given intersection points between the spatiotemporal volume's trajectory and the global spatiotemporal line. In some cases, a linear trajectory interpolating transform may be used.

At operation 1812, block interpolation may be performed. In some cases, the same or similar interpolating orthonormal transforms used for trajectory interpolation may be used for block interpolation. Once the 1-D transform along the third dimension is inverted, the interpolating transforms may be applied to the stack of 2-D DCT transformed blocks to obtain the interpolated blocks at the synthesis points lying in the global spatiotemporal line. For each of the spatiotemporal volumes, the intersection between its trajectory and the global spatiotemporal line may be determined and used to interpolate position and content of an intermediate block within the STV. As such, blocks may be synthesized in the intersections between the group trajectory and the global spatiotemporal line.

Figure 20:
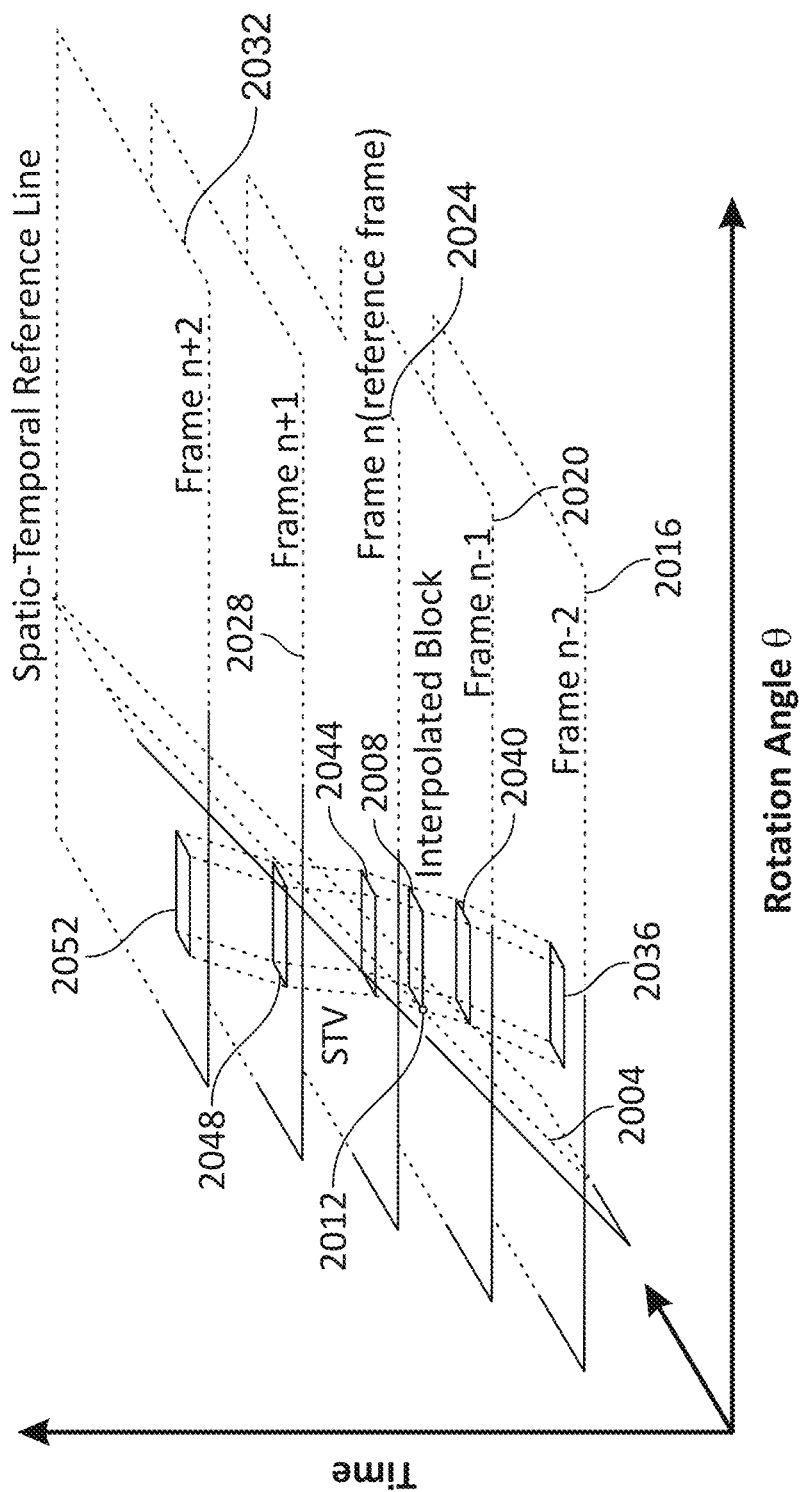
FIG. 20 illustrates an example of a global spatiotemporal line with an interpolated block in an intersection with the global spatiotemporal line in accordance with one or more embodiments of the present disclosure.

For example, FIG. 20 illustrates an example of a global spatiotemporal line 2004 with an interpolated block 2008 in an intersection 2012 with the global spatiotemporal line 2004 in accordance with one or more embodiments of the present disclosure. Image frames (e.g., 2016, 2020, 2024, 2028, 2032) are provided on the global spatiotemporal line 2004. A block 2036, 2040, 2044, 2048, and 2052 is shown for the image frame 2016, 2020, 2024, 2028, and 2032, respectively. In FIG. 20, the image frame 2024 is a reference frame. The interpolated block 2008 is an interpolated block between the image frames 2020 and 2024. Different frames are acquired at different discrete instants in time (e.g., along vertical axis).

In an aspect, FIG. 20 may be considered an extension of FIG. 19 along a third axis that represents different rows of the video frames. In this regard, the video frames are represented as 2-D planes in FIG. 20 rather than as lines in FIG. 19. A global spatiotemporal line is repeated for every row of the video frame, in which the repeated global spatiotemporal lines (e.g., including the global spatiotemporal line 2004) form a plane. As such, the global spatiotemporal line is extended along this third dimension (e.g., repeated for each row of the video frames), and thus the repeated global spatiotemporal lines are represented as a plane in FIG. 20, to allow visualization of the intersection of the global spatiotemporal line with the trajectory of the spatiotemporal volume. The plane includes the global spatiotemporal line 2004.

Referring back to FIG. 18, at operation 1816, a sub-pixel shift of blocks may be performed. Due to spatiotemporal trajectory interpolation, interpolated blocks may need to be aggregated onto non-integer coordinates within the panoramic image. This may be addressed by aggregating a sub-pixel-shifted version of the block to the integer part of its coordinates. In an aspect, the sub-pixel shift (e.g., corresponding to the decimal part of the position) may be achieved by synthesizing the block from its block-DCT representation (e.g., two-dimensional spectrum) by using a 2-D DCT-based transform which inherently contains the corresponding shift. In some cases, a set of different 1-D DCT transform matrices may be created and stored, with each transform matrix inherently containing a shift from a set of pre-defined possible shifts. For each block, an appropriate (e.g., a most appropriate) 1-D DCT transform matrix may be selected by choosing the one with the shift closest to the actual displacement needed in that dimension. In this regard, positions in the panoramic image of the synthesized blocks are determined. In some cases, basis elements for a 1-D DCT transform with a sub-pixel shifts may be defined as $$b_k = \begin{cases} \frac{1}{\sqrt{N}}, & k = 0, 0 \le j \le N-1 \\ \sqrt{\frac{2}{N}} \cos\left[\pi k \frac{2(j-s)+1}{2N}\right], & 1 \le k \le N-1, 0 \le j \le N-1 \end{cases} \quad (25)$$

where N is the length of the transform (e.g., size of the block).

Referring back to FIG. 13, after the spatiotemporal interpolation and transform inversion, at operation 1352, the interpolated blocks are aggregated to their corresponding positions in the panoramic image. In this regard, block estimates may be aggregated onto the panoramic image estimate. In general, the different block estimates overlap. In some cases, the blocks may be aggregated into a first buffer (e.g., an estimate buffer) using their newly calculated spatiotemporal coordinates within the panoramic image and their corresponding weights in the convex combination. The weight of the blocks may be aggregated into a second buffer (e.g., a weight buffer). In these cases, when the input frames (e.g., every input frame) composing the panoramic image (e.g., 360° panoramic image) has been processed, a final panoramic estimate may be obtained by dividing each estimate in the estimate buffer by its corresponding weight in the weight buffer. In an aspect, the final panoramic estimate may be the reconstructed image provided as an output of the reconstruction pipeline.

Figure 21A:
FIGS. 21A and 21B illustrate an example of a panoramic image before and after, respectively, performing rotation compensation in accordance with one or more embodiments of the present disclosure.
Figure 21B:

At operation 1356, a rotation compensation may be performed. In an aspect, the rotation compensation may be considered post-processing of the output of the reconstruction pipeline (e.g., the final panoramic estimate output from the pipeline). In an aspect, the rotation compensation may be referred to as a rolling shutter compensation. In this regard, the rolling shutter frame acquisition from a rotating imager (e.g., the image capture component 130) may create artifacts. In the horizontal rotation case, the rotation compensation takes into consideration a horizontal rolling shutter and rotation around a vertical axis. Such rotation may create a horizontal shearing effect on the captured images that remains in the reconstructed panoramic image (e.g., reconstructed 360° panoramic image output from the pipeline). The rotation compensation may include performing a de-shearing to compensate for the shearing effect. FIGS. 21A and 21B illustrate an example of a panoramic image before and after, respectively, performing rotation compensation in accordance with one or more embodiments of the present disclosure.

Figure 18:
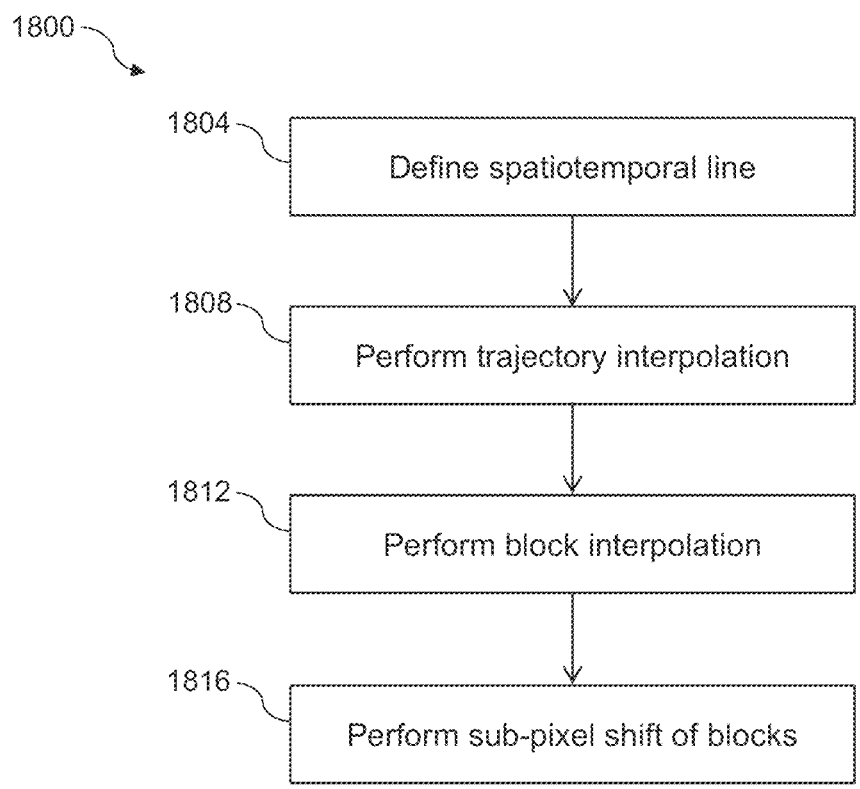
FIG. 18 illustrates a flowchart of a process to perform spatiotemporal interpolation in accordance with one or more embodiments of the present disclosure.

Thus, in some embodiments, as shown in the processes 1300 and 1800 of FIGS. 13 and 18, respectively, generation of panoramic images may be facilitated by performing operations for a spatial column noise removal stage, deblurring stage, and denoising stage, where panoramic image reconstruction is integrated within the denoising stage. In an aspect, the spatial column noise removal stage may be applied prior to the deblurring stage since the spatial column noise removal stage may efficiently attenuate column noise without introducing artifacts that may affect the deblurring stage. The deblurring stage may be performed prior to the denoising stage since the PSF of the blur corrupting the images may have a known formulation. In this regard, the deblurring stage is performed at a point where the PSF is known. In applying the deblurring, spectral characteristics of the noise components (e.g., random noise and fixed-pattern noise) may change (e.g., generally noise is amplified). Equations (21) and (22) may be utilized to determine the new PSDs of the noise. The new noise characteristics may generally allow better signal-noise separation. Such improved signal-noise separation may facilitate the denoising stage.

It is noted that the processes 1300 and 1800 of FIGS. 13 and 18, respectively, associated with facilitating generation of panoramic images are provided by way of non-limiting example. Note that one or more operations of FIGS. 13 and 18 may be combined, omitted, and/or performed in a different order as desired. Furthermore, other processes may be performed to facilitate generation of panoramic images.

For example, with reference to FIG. 13, the spatial column noise removal stage and denoising stage may be applied before the deblurring stage. In this example, the panoramic image reconstruction may be integrated within the denoising stage as described above, such that the order is provided as follows: spatial column noise removal stage, denoising stage with integrated panoramic reconstruction, and deblurring stage. In some cases, this order may be associated with artifacts and residual noise from denoising that may be amplified in the deblurring stage.

In some cases, if the spatial column noise removal stage were to be performed after the deblurring stage, the deblurring stage may amplify column noise while also changing characteristics of the column noise (e.g., due to a convolution against a deblurring kernel), such as introducing horizontal correlation. In such cases, the column noise (e.g., the amplified and changed column noise) may be more difficult to suppress after the deblurring stage, relative to a case in which the spatial column noise removal stage is performed to suppress the column noise prior to the deblurring stage. To mitigate the column noise in the case that the deblurring stage is performed prior to the spatial column noise removal stage, the effect of the deblurring stage on the column noise may be accounted for by adjusting the various formulations. For example, Equations (12) and (24), among others, may be adjusted to account for the effect of the deblurring stage on the column noise, such as by adding terms for the column noise in the noise model.

In some cases, if the denoising stage were to be performed before the deblurring stage, the denoising stage (e.g., generally a non-linear operation) may cause the PSF of the blur corrupting the images to change relative to a case in which the denoising stage is performed after the deblurring stage. The PSF of the blur may need to be determined since the PSF known for the case when the deblurring stage is performed before the denoising stage may no longer apply. The deblurring stage may take into consideration amplification of noise residual and possible artifacts from the denoising stage, while not needing to determine new PSDs (e.g., the original PSDs may be used in denoising before deblurring). As such, in some embodiments, different orders for performing the spatial column noise removal stage, deblurring stage, and denoising stage with integrated panoramic image reconstruction may be performed, with considerations to computational complexity and which formulations/relationships are known and/or need to be adjusted.

Thus, using various embodiments, a rotating imager (e.g., the image capture component 130) may be designed so that acquired images can be used for a panoramic image reconstruction of a desired quality. In general, utilization of a single rotating imager to capture images that may then be synthesized into a panoramic image is associated with lower costs compared to a case in which multiple imagers with different FOVs are used to capture the images. Quality of the reconstruction (e.g., denoising and reconstruction quality) may generally be based on (e.g., proportional to) an amount of overlap between consecutive images. In this regard, the denoising may rely on non-local similarities among several consecutive images to obtain an estimate of the scene. Such reliance on non-local similarities may be facilitated by providing enough overlap between frames. In an aspect, the rotating imager may be configured to capture images with a minimum overlap of 50% between frames.

In some aspects, a rotation speed of the rotating imager may affect reconstruction quality. The rotation speed may determine a length of the motion blur PSF and an amount of overlap between adjacent frames. In general, a higher rotation speed may yield longer PSFs, which may be associated with deblurring that is more difficult to mitigate (e.g., stronger noise after regularized inverse, less sharp results). Higher rotation speeds may reduce the overlap between consecutive images, which may impact denoising quality.

An FOV of a lens of the rotating imager may also determine the amount of overlap between frames. As such, for a given rotation speed, a wider FOV of the lens may allow for a larger overlap between adjacent frames (e.g., images captured in adjacent FOVs), which may generally be associated with higher reconstruction quality. An orientation of the rotating imager may determine an effect of the rolling shutter on the reconstructed panoramic image. In some embodiments, the rotating imager may be designed for landscape orientation (e.g., horizontal rolling shutter), which may produce a horizontal shear in the acquired images.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method, comprising:
receiving a first sequence of images captured during continuous rotation of an image sensor, wherein the first sequence is associated with a scene, and wherein each image of the first sequence has a portion that overlaps with another image of the first sequence; and
generating a first panoramic image, wherein the generating comprises:
processing a second sequence of images based on a first point-spread function (PSF) to mitigate blur associated with the continuous rotation of the image sensor to obtain a deblurred sequence of images, wherein the first PSF is associated with a rotation speed of the image sensor, and wherein the second sequence is based on the first sequence; and
processing the deblurred sequence of images based on at least one noise power spectral density (PSD) to obtain a denoised sequence of images, wherein the first panoramic image is based on the denoised sequence of images, wherein the at least one noise PSD comprises a first random noise PSD and a first fixed-pattern noise PSD, and wherein the first random noise PSD and the first fixed-pattern noise PSD are based on the rotation speed of the image sensor; and
in response to a change in the rotation speed of the image sensor, determining a second PSF different from the first PSF, a second random noise PSD different from the first random noise PSD, and a second fixed-pattern noise PSD different from the first fixed-pattern noise PSD.

2. The method of claim 1, further comprising:
determining shear in the first panoramic image, wherein the shear is based at least on the continuous rotation of the image sensor when capturing the first sequence of images; and
applying a de-shear on the first panoramic image to obtain a second panoramic image.

3. The method of claim 1, wherein the continuous rotation comprises a continuous azimuthal rotation, and wherein the generating further comprises processing the first sequence of images to mitigate spatial column noise to obtain the second sequence of images.

4. The method of claim 1, further comprising capturing, by the image sensor as the image sensor rotates, the first sequence, wherein each image of the first sequence is associated with a respective field of view and a respective capture time.

5. The method of claim 1, wherein the portion of each image of the first sequence that overlaps with another image of the first sequence comprises at least 50% of the image.

6. The method of claim 1, wherein the processing the deblurred sequence comprises determining a reference spatiotemporal line that provides a space-time coordinate system on which the first panoramic image is generated.

7. The method of claim 1, wherein the first panoramic image is a 360 degree field of view image.

8. The method of claim 1, wherein the image sensor comprises a thermal infrared image sensor, and wherein each image of the first sequence is a thermal infrared image.

9. A system, comprising:
an image sensor configured to capture a first sequence of images during continuous rotation of the image sensor, wherein the first sequence is associated with a scene, and wherein each image of the first sequence has a portion that overlaps with another image of the first sequence;
a non-transitory memory storing computer instructions; and
one or more hardware processors communicatively coupled to the image sensor and the non-transitory memory, the one or more hardware processors configured to read the computer instructions from the non-transitory memory to cause the system to perform operations comprising:
receiving the first sequence of images; and
generating a first panoramic image, wherein the generating comprises:
processing a second sequence of images based on a first point-spread function (PSF) to mitigate blur associated with the continuous rotation of the image sensor to obtain a deblurred sequence of images, wherein the first PSF is associated with a rotation speed of the image sensor, and wherein the second sequence is based on the first sequence;
processing the deblurred sequence of images based on a first noise power spectral density (PSD) to obtain a denoised sequence of images, wherein the first panoramic image is based on the deblurred sequence of images; and
determining, in response to a change in the rotation speed of the image sensor, a second PSF different from the first PSF and a second noise PSD different from the first noise PSD.

10. The system of claim 9, wherein the operations further comprise:
determining shear in the first panoramic image, wherein the shear is based at least on the continuous rotation of the image sensor when capturing the first sequence of images; and
applying a de-shear on the first panoramic image to obtain a second panoramic image.

11. The system of claim 9, wherein the continuous rotation comprises a continuous azimuthal rotation, and wherein the generating further comprises processing the first sequence of images to mitigate spatial column noise to obtain the second sequence of images.

12. The system of claim 9, wherein each image of the first sequence is associated with a respective field of view and a respective capture time, and wherein the portion of each image of the first sequence that overlaps with another image of the first sequence comprises at least 50% of the image.

13. The system of claim 9, wherein the processing the deblurred sequence comprises:

determining a reference spatiotemporal line that provides a space-time coordinate system on which the first panoramic image is generated;
constructing a plurality of spatiotemporal volumes based on the deblurred sequence, wherein each of the plurality of spatiotemporal volumes is associated with a respective trajectory;
for each spatiotemporal volume of the plurality of spatiotemporal volumes:
determining an intersection between the trajectory of the spatiotemporal volume and the reference spatiotemporal line; and
generating an interpolated block associated with the spatiotemporal volume, wherein position and content of the interpolated block is based at least on the intersection; and
aggregating each interpolated block to its corresponding position in the first panoramic image.

14. The system of claim 13, wherein the processing the deblurred sequence further comprises performing a sub-pixel shift on each interpolated block based on coordinates associated with the first panoramic image to obtain a sub-pixel-shifted version of the interpolated block, and wherein the aggregating comprises aggregating the sub-pixel-shifted version of each interpolated block to its corresponding position in the first panoramic image.

15. The system of claim 9, wherein the first panoramic image is a 360 degree field of view image, and wherein the image sensor comprises a thermal infrared image sensor, and wherein each image of the first sequence is a thermal infrared image.

16. The system of claim 9, wherein the image sensor comprises a thermal infrared image sensor, and wherein each image of the first sequence is a thermal infrared image.

17. A method, comprising:
receiving a first sequence of images captured during continuous rotation of an image sensor, wherein the first sequence is associated with a scene, and wherein each image of the first sequence has a portion that overlaps with another image of the first sequence; and
generating a first panoramic image, wherein the generating comprises:
processing a second sequence of images based on a first point-spread function (PSF) to mitigate blur associated with the continuous rotation of the image sensor to obtain a deblurred sequence of images, wherein the first PSF is associated with a rotation speed of the image sensor, and wherein the second sequence is based on the first sequence; and
processing the deblurred sequence of images based on at least one noise power spectral density (PSD) to obtain a denoised sequence of images, wherein the first panoramic image is based on the denoised sequence of images, wherein the processing the deblurred sequence comprises:
determining a reference spatiotemporal line that provides a space-time coordinate system on which the first panoramic image is generated;
constructing a plurality of spatiotemporal volumes based on the deblurred sequence, wherein each of the plurality of spatiotemporal volumes is associated with a respective trajectory;
for each spatiotemporal volume of the plurality of spatiotemporal volumes:
determining an intersection between the trajectory of the spatiotemporal volume and the reference spatiotemporal line; and generating an interpolated block associated with the spatiotemporal volume, wherein position and content of the interpolated block is based at least on the intersection; and aggregating each interpolated block to its corresponding position in the first panoramic image.

18. The method of claim 17, wherein the processing the deblurred sequence further comprises performing a sub-pixel shift on each interpolated block based on coordinates associated with the first panoramic image to obtain a sub-pixel-shifted version of the interpolated block, and wherein the aggregating comprises aggregating the sub-pixel-shifted version of each interpolated block to its corresponding position in the first panoramic image.

19. The method of claim 17, wherein the at least one noise PSD comprises a first random noise PSD and a first fixed-pattern noise PSD, and wherein the first random noise PSD and first fixed-pattern noise PSD are based on the rotation speed of the image sensor.

20. The method of claim 19, further comprising, in response to a change in the rotation speed of the image sensor, determining a second PSF different from the first PSF, a second random noise PSD different from the first random noise PSD, and a second fixed-pattern noise PSD different from the first fixed-pattern noise PSD.

* * * * *

UNITED STATES PATENT AND TRADEMARK OFFICE
CERTIFICATE OF CORRECTION

PATENT NO. : 11,416,970 B2
APPLICATION NO. : 17/087551
DATED : August 16, 2022
INVENTOR(S) : Enrique Sanchez-Monge and Alessandro Foi Page 1 of 1

It is certified that error appears in the above-identified patent and that said Letters Patent is hereby corrected as shown below:

In the Specification

In Column 16, Line 48, change, "$\sigma_{RND}^2$ and $\sigma_{FPN}^2$" to -- $\sigma^2_{RND}$ and $\sigma^2_{FPN}$ --.

In Column 18, Line 11, change, "$\sigma_{FPN}^2 = \sigma_{RND+FPN} - \sigma_{RND}^2$" to -- $\sigma^2_{FPN} = \sigma^2_{RND+FPN} - \sigma^2_{RND}$ --.

In Column 22, Line 63, change, "$psd_{RND}^{2DT}$ and $psd_{FDN}^{2DT}$" to -- $psd^{2DT}_{RND}$ and $psd^{2DT}_{RND}$ --.

In Column 28, Line 11, change, "$\sigma_{RND}^2$" to -- $\sigma^2_{RND}$ --.

Signed and Sealed this
Twenty-ninth Day of November, 2022

Katherine Kelly Vidal
*Director of the United States Patent and Trademark Office*